(12) United States Patent
Jiang et al.

(10) Patent No.: US 12,717,463 B2
(45) Date of Patent: Aug. 25, 2026

(54) INTERACTION METHOD FOR MULTIMEDIA CONTENT, DEVICE, MEDIUM, AND PROGRAM PRODUCT

(71) Applicant: Beijing Zitiao Network Technology Co., Ltd., Beijing (CN)

(72) Inventors: Xiang Jiang, Beijing (CN); Dandan Shen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/086,057

(22) Filed: Mar. 20, 2025

(65) Prior Publication Data

US 2025/0383760 A1 Dec. 18, 2025

Related U.S. Application Data

(63) Continuation of application No. PCT/CN2024/099686, filed on Jun. 17, 2024.

(51) Int. Cl.
*G06F 3/0484* (2022.01)
*G06F 3/0481* (2022.01)

(52) U.S. Cl.
CPC .......... *G06F 3/0484* (2013.01); *G06F 3/0481* (2013.01)

(58) Field of Classification Search
None
See application file for complete search history.

(56) References Cited

U.S. PATENT DOCUMENTS 11,748,555 B2 * 9/2023 Tran .................... G06N 3/047 715/202
12,118,513 B1 * 10/2024 Lu .................... G06F 40/40
12,211,131 B1 * 1/2025 Sadoughi Nourabadi .................. G06T 7/194
2007/0166684 A1 * 7/2007 Walker .................... G09B 7/02 434/322

(Continued)

FOREIGN PATENT DOCUMENTS

CN 111309228 A 6/2020
CN 117290525 A 12/2023
CN 117519544 A 2/2024

OTHER PUBLICATIONS

International Search Report for International Application No. PCT/CN2024/099686, mailed on Jan. 24, 2025, 3 pages.

(Continued)

*Primary Examiner* — Tuyetlien T Tran
(74) *Attorney, Agent, or Firm* — Astute IP Law Group

(57) ABSTRACT

Embodiments of the present disclosure provide an interaction method for multimedia content, a device, a storage medium, and a computer program product. The method comprises: displaying a dialogue interface for generating multimedia content, in response to a trigger operation; displaying, in the dialogue interface, a multimedia content outline associated with multimedia content to be generated, in response to receiving a request for generating the multimedia content; and displaying the generated multimedia content based on a multimedia generation instruction. The multimedia generation instruction indicates confirmation of the multimedia content outline or confirmation of an edited multimedia content outline in the dialogue interface.

18 Claims, 23 Drawing Sheets

(56) References Cited

U.S. PATENT DOCUMENTS

| | | | | |
|---|---|---|---|---|
| 2015/0039297 | A1* | 2/2015 | Greer | G06F 40/30 704/9 |
| 2017/0366496 | A1* | 12/2017 | Habermehl | H04L 51/226 |
| 2021/0082419 | A1* | 3/2021 | Tran | G09B 7/00 |
| 2022/0368553 | A1* | 11/2022 | Lu | G06F 8/33 |
| 2022/0414320 | A1 | 12/2022 | Dolan et al. | |
| 2023/0059637 | A1* | 2/2023 | Wu | H04N 21/4788 |
| 2023/0252224 | A1* | 8/2023 | Tran | G06F 40/56 715/256 |
| 2023/0320642 | A1* | 10/2023 | Lin | G06F 40/30 |
| 2024/0273793 | A1* | 8/2024 | DeCharms | G09B 5/06 |
| 2024/0354503 | A1* | 10/2024 | Baruch | G06F 16/345 |
| 2024/0362405 | A1* | 10/2024 | Sultanum | G06F 40/166 |
| 2024/0362410 | A1* | 10/2024 | Dalal | G06F 9/451 |
| 2024/0370479 | A1* | 11/2024 | Hudetz | G06F 16/316 |
| 2024/0371407 | A1* | 11/2024 | Grant | G11B 27/031 |
| 2024/0386197 | A1* | 11/2024 | Perez | G06F 9/547 |
| 2024/0404225 | A1* | 12/2024 | Ghosh | G06T 7/74 |
| 2024/0419922 | A1* | 12/2024 | Molitor | G06F 3/0482 |
| 2025/0005258 | A1* | 1/2025 | Jiang | G10L 15/22 |
| 2025/0005523 | A1* | 1/2025 | Katta | G06N 3/047 |
| 2025/0078357 | A1* | 3/2025 | Shen | G06F 40/30 |
| 2025/0124080 | A1* | 4/2025 | Kim | H04N 21/2743 |
| 2025/0139636 | A1* | 5/2025 | Mangano | G06Q 30/01 |
| 2025/0156778 | A1* | 5/2025 | Kaliyaperumal | G06Q 10/063112 |

OTHER PUBLICATIONS

Extended European Search Report received for European Patent Application No. 24857448.5, mailed on Nov. 3, 2025, 8 pages.

* cited by examiner

INTERACTION METHOD FOR MULTIMEDIA CONTENT, DEVICE, MEDIUM, AND PROGRAM PRODUCT

CROSS-REFERENCE TO RELATED APPLICATION(S)

This application is a Continuation Application of International Patent Application No. PCT/CN2024/099686, filed Jun. 17, 2024, which claims priority to Chinese Application No. 202480002194.0 filed Jun. 17, 2024, the disclosures of which are incorporated herein by reference in their entities.

FIELD

The present disclosure generally relates to the field of computers, and more particularly, to an interaction method for multimedia content, an electronic device, a computer-readable storage medium, and a computer program product.

BACKGROUND

With continuous development of an artificial intelligence (AI) technology, an application scenario of the AI technology continuously expands and gradually covers various fields. For example, from smart home to agriculture, and from the retail industry to the manufacturing industry, the application of the AI technology is affecting people's life and work. In addition, the AI technology is widely applied to various fields such as finance, education, transportation, and health care, and has brought great impetus to social and economic development.

SUMMARY

According to example embodiments of the present disclosure, an interaction method for multimedia content, an electronic device, a computer storage medium, and a computer program product are provided.

According to a first aspect of the present disclosure, there is provided an interaction method for multimedia content, comprising: displaying a dialogue interface for generating multimedia content, in response to a trigger operation; displaying, in the dialogue interface, a multimedia content outline associated with multimedia content to be generated, in response to receiving a request for generating the multimedia content; and displaying the generated multimedia content based on a multimedia generation instruction. The multimedia generation instruction indicates confirmation of the multimedia content outline or confirmation of an edited multimedia content outline in the dialogue interface.

According to a second aspect of the present disclosure, there is provided an electronic device, comprising: at least one processing unit; and at least one memory, where the at least one memory is coupled to the at least one processing unit, and stores instructions executable by the at least one processing unit, and the instructions, when executed by the at least one processing unit, cause the electronic device to perform the method described in the first aspect of the present disclosure.

According to a third aspect of the present disclosure, there is provided a computer-readable storage medium. The computer-readable storage medium has machine-executable instructions stored thereon, and the machine-executable instructions, when executed by a device, cause the device to perform the method described in the first aspect of the present disclosure.

According to a fourth aspect of the present disclosure, there is provided a computer program product, including computer-executable instructions. The computer-executable instructions, when executed by a processor, cause the method described in the first aspect of the present disclosure to be implemented.

The section Summary is provided to describe a series of concepts in a simplified form, which will be further described in the detailed description below. The section Summary is neither intended to identify critical or essential features of the present disclosure, nor is it intended to limit the scope of the present disclosure. Other features of the present disclosure will be readily understood from the following description.

BRIEF DESCRIPTION OF THE DRAWINGS

The above and other features, advantages, and aspects of embodiments of the present disclosure become more apparent with reference to the following detailed description and in conjunction with the accompanying drawings. In the accompanying drawings, the same or similar reference numerals denote the same or similar elements.

DETAILED DESCRIPTION OF EMBODIMENTS

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for example purposes, and are not intended to limit the scope of protection of the present disclosure.

Currently, an artificial intelligence technology is applied to various application scenarios. With continuous development of intelligent models and continuous emergence of large-scale datasets, the artificial intelligence technology has made significant progress and development in generating multimedia content (for example, text, image, or audio), and has brought much convenience and innovation to people's work and life. It is also a hotspot of a current research to use an interaction operation to meet a personalized need of a user to the maximum extent and improve user experience while multimedia content that meets a requirement is generated. Therefore, there is a need for a technical solution in which an interaction operation can be used to meet a personalized need of a user to the maximum extent and improve user experience in a process of generating multimedia content.

In view of this, the embodiments of the present disclosure provide an interaction method for multimedia content. The method may comprise: displaying a dialogue interface for generating multimedia content, in response to a trigger operation; displaying, in the dialogue interface, a multimedia content outline associated with multimedia content to be generated, in response to receiving a request for generating the multimedia content; and displaying the generated multimedia content based on a multimedia generation instruction. The multimedia generation instruction indicates confirmation of the multimedia content outline or confirmation of an edited multimedia content outline in the dialogue interface. According to the method in the embodiments of the present disclosure, the multimedia content outline can be provided for a user before the multimedia content is generated, and the user can perform an edit operation on the multimedia content outline in a user-friendly interaction interface, to obtain multimedia content that meets a personalized requirement of the user and further improve user experience.

Figure 1:
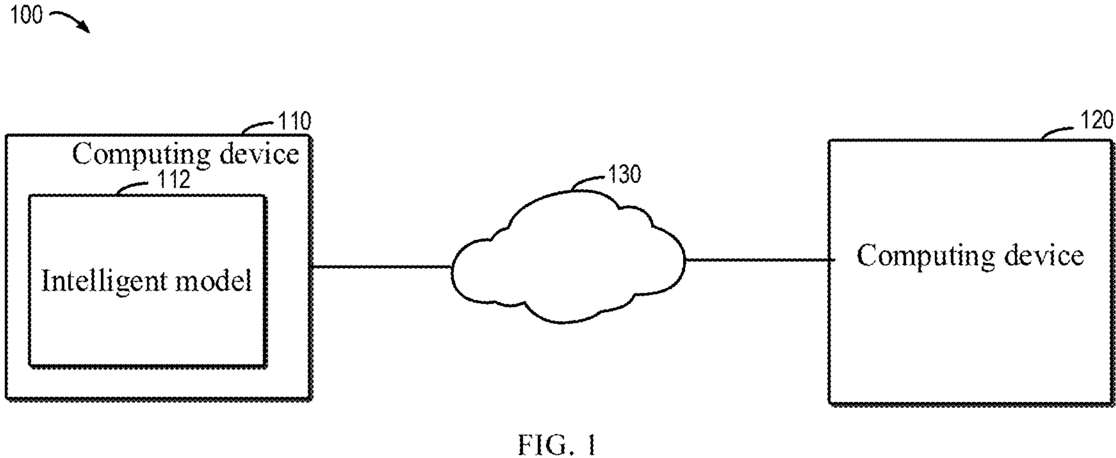
FIG. 1 is a schematic diagram of an example system in which the embodiments of the present disclosure can be implemented.

The embodiments of the present disclosure are further described in detail below with reference to the accompanying drawings. FIG. 1 is a schematic diagram of an example environment 100 in which the embodiments of the present disclosure can be implemented. The example environment 100 comprises a computing device 110 and a computing device 120. The computing device 110 may be deployed with an intelligent model 112 (for example, an artificial intelligence model such as a generative intelligence model). The intelligent model 112 may generate various content through training, including but not limited to multimedia content. The computing device 120 is further shown in FIG. 1. In some embodiments, the computing device 120 and the computing device 110 communicate over a network 130. The network 130 may include a wired network, a wireless network, or a combination thereof, and is used to provide communication between the computing device 120 and the computing device 110. In some embodiments, the computing device 120 may be connected to the computing device 110 through a data line. The present disclosure sets no limitation on a connection manner between the computing device 110 and the computing device 120.

The computing device 110 and the computing device 120 may include but are not limited to a personal computer, a server computer, a handheld or laptop device, a mobile device (for example, a mobile phone, a personal digital assistant (PDA), or a media player), a multiprocessor system, a consumer electronics product, a wearable electronic device, a smart home device, a minicomputer, a mainframe computer, an edge computing device, or a distributed computing system including any one of the above systems or devices.

The computing device 120 may be installed with an application program (for example, a client program) for invoking the intelligent model 112 to generate the multimedia content. The system 100 in FIG. 1 is taken as an example. The computing device 120 may communicate with the computing device 110 over the network 130, and send a request for generating multimedia content to the intelligent model 112 in the computing device 110. The intelligent model 112 in the computing device 110 may generate the multimedia content and provide the generated multimedia content to the computing device 120 in response to the request from the computing device 120.

In some embodiments, the computing device 120 may display, in an interface (for example, a main interface) of the application program in response to a trigger operation, a dialogue interface for generating multimedia content. The computing device 120 may display, in the dialogue interface, a multimedia content outline associated with multimedia content to be generated, in response to receiving the request for generating the multimedia content. In some embodiments, the computing device 120 may send the request for generating the multimedia content to the computing device 110, so that the intelligent model 112 in the computing device 110 generates, based on the request for generating the multimedia content, the multimedia content outline associated with the multimedia content. The computing device 110 may send the generated multimedia content outline to the computing device 120, to display the generated multimedia content outline in the dialogue interface of the computing device 120. The computing device 120 may further obtain and display the generated multimedia content based on a multimedia generation instruction. The multimedia generation instruction indicates confirmation of a multimedia content outline displayed in the current dialogue interface or confirmation of an edited multimedia content outline in the current dialogue interface.

In some embodiments, a user of the computing device 120 may browse the multimedia content outline displayed in the dialogue interface, and determine whether an edit operation needs to be performed on the multimedia content outline in the current dialogue interface. If the user determines not to perform the edit operation, in other words, the user considers that a currently generated multimedia content outline meets a requirement, the multimedia generation instruction may be triggered to generate the multimedia content. In addition, the user may further perform the edit operation on the multimedia content outline, and after the edit operation ends and a multimedia content outline that meets an expectation is obtained, the user triggers the multimedia generation instruction to trigger generation of the multimedia content.

The computing device 120 may respond to the multimedia generation instruction, and send an instruction for generating the multimedia content to the computing device 110, so that the intelligent model 112 generates the multimedia content based on a multimedia content outline (a multimedia content outline on which an edit operation is performed or a multimedia content outline on which no edit operation is performed) confirmed by the user. The computing device 110 may send the generated multimedia content to the computing device 120, and display the generated multimedia content in an interface, for example, a multimedia content editing interface, of the computing device 120.

It may be understood that although the intelligent model 112 is deployed in the computing device 110 in FIG. 1, the intelligent model 112 may be split into a plurality of submodels according to actual needs, and each submodel may be deployed in a corresponding computing device to implement, for example, distributed deployment, so as to support a large-scale model. Correspondingly, the corresponding computing device may send generated information to the computing device 120 and display the generated information in response to a request or a command from the computing device 120.

In addition, although the intelligent model 112 and the computing device 120 are separately deployed as shown in FIG. 1, it may be understood that as the intelligent model 112 becomes lightweight, the intelligent model 112 may alternatively be locally deployed in the computing device 120, to respond to a request of the user more quickly, and generate corresponding information. When the intelligent model 112 is locally deployed in the computing device 120, a corresponding interaction method for multimedia content is similar to the process described with reference to FIG. 1, and may be understood by a person skilled in the art with reference to the above description. For the sake of brevity, details are not described herein again.

According to the interaction method for multimedia content in the embodiments of the present disclosure, a multimedia content outline can be provided for a user before multimedia content is generated, and the user can perform an edit operation on the multimedia content outline in a user-friendly interaction interface, to obtain multimedia content that meets a personalized requirement of the user and further improve user experience.

Figure 2:
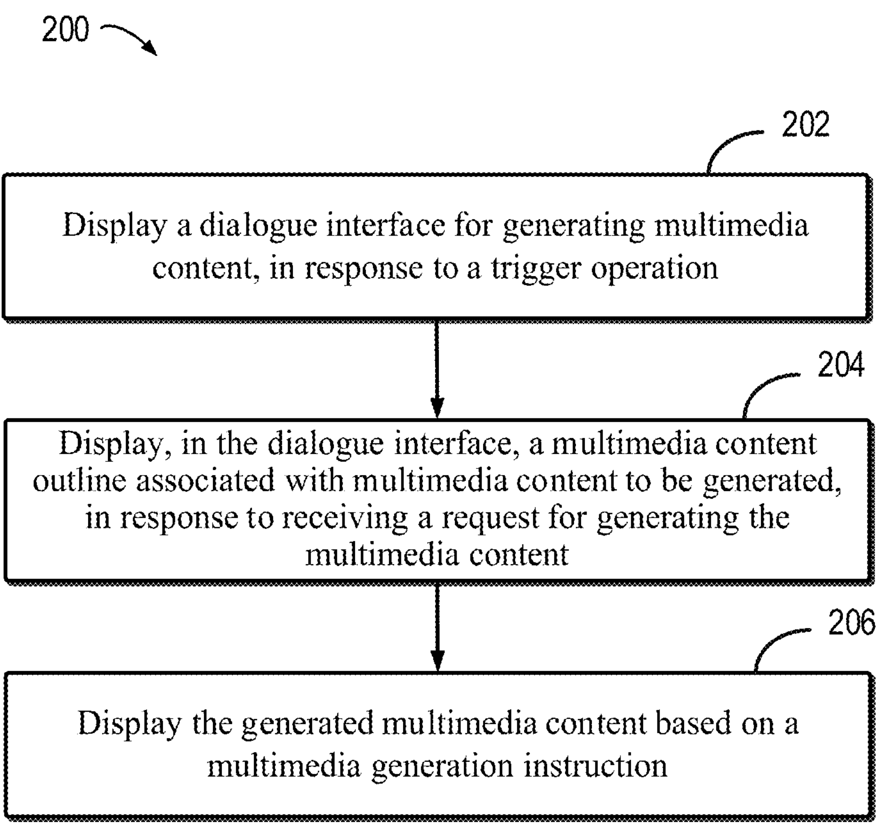
FIG. 2 is a flowchart of an interaction method for multimedia content according to an embodiment of the present disclosure.

A block diagram of the example environment 100 in which the embodiments of the present disclosure can be implemented is described above with reference to FIG. 1. An interaction method for multimedia content according to an embodiment of the present disclosure is described below with reference to FIG. 2. FIG. 2 is a flowchart of an interaction method 200 for multimedia content according to an embodiment of the present disclosure. The method 200 may be performed in the computing device 120 in FIG. 1 or in any proper computing device. It should be understood that a number in the flowchart of the method 200 does not indicate a sequence in which the steps are performed, and some or all of the steps may be performed in parallel, or an execution sequence may be interchanged, which is not limited in the present disclosure. In addition, the method 200 in FIG. 2 may further include additional steps not shown and/or shown steps may be omitted, and the scope of the present disclosure is not limited in this respect.

In block 202, the computing device 120 may display a dialogue interface for generating multimedia content, in response to a trigger operation. In some embodiments, the computing device 120 may be installed with an application program (for example, a client program) for invoking an intelligent model 112 to generate the multimedia content, to perform the interaction method for multimedia content according to this embodiment of the present disclosure.

In some embodiments, the computing device 120 may start the application program, and display a trigger control in an interface (for example, a start interface or a main interface of the application program) after the application program is started. A user may tap or touch the trigger control to start the trigger operation. For example, the trigger control may be a key control displayed in a current interface. Alternatively, the user may start the trigger operation by using a voice, or the like. The present disclosure sets no limitation on a specific implementation of the trigger operation.

The computing device 120 may display the dialogue interface for generating the multimedia content, in response to the trigger operation of the user. The dialogue interface may include an input area and an information display area. The input area may receive input information of the user, and transmit the input information to the intelligent model 112 in the computing device 110, so that the model 112 generates a corresponding result based on the information entered by the user and sends the result to the computing device 120. The computing device 120 may display the received result in the information display area, to facilitate browsing by the user.

In block 204, the computing device 120 may display, in the dialogue interface, a multimedia content outline associated with multimedia content to be generated, in response to receiving a request for generating the multimedia content.

In some embodiments, the computing device 120 may receive the request for generating the multimedia content that is entered into the input area in the dialogue interface. In some embodiments, the request may include prompt information associated with the multimedia content to be generated. The prompt information may represent related content (for example, a subject) of the multimedia content to be generated, an information size (which may be a number of characters when text information is taken as an example, may be resolution when image information is taken as an example, or the like), a keyword in content to be generated, an application field, or the like.

The computing device 120 may display, in the dialogue interface, the multimedia content outline associated with the multimedia content to be generated, in response to receiving the request for generating the multimedia content. In some embodiments, the computing device 120 may send the received request for generating the multimedia content to the intelligent model 112, so that the model 112 generates the multimedia content outline associated with the multimedia content based on the request. The computing device 120 may obtain the multimedia content outline generated by the model 112, and display the obtained multimedia content outline in a current dialogue interface. For example, the multimedia content outline may be displayed in the information display area in the dialogue interface, to facilitate browsing by the user.

In some embodiments, the multimedia content outline may represent, by using a plurality of levels and in a form in which each level includes at least one part, a structure of the multimedia content to be generated. For example, a multimedia content outline that includes two levels in which a first level includes two parts and a second level includes three parts represents that the structure of the multimedia content is divided into two parts, the first part includes two subparts, and the second part includes three subparts. In addition, the multimedia content outline provides a brief description for each level and each part of the corresponding level, to indicate main content of the generated multimedia content in the corresponding part.

The multimedia content outline is displayed in the dialogue interface for the user, so that the user can learn, before obtaining the generated multimedia content, of an overview of the multimedia content to be generated. This helps the user determine in a later step whether the multimedia content outline needs to be adjusted, to obtain multimedia content that better meets a requirement or a need.

In block 206, the computing device 120 may display the generated multimedia content based on a multimedia generation instruction. In some embodiments, the multimedia generation instruction indicates confirmation of the multimedia content outline or confirmation of an edited multimedia content outline in the dialogue interface.

In some embodiments, the computing device 120 display the multimedia content outline, for example, in the information display area in the dialogue interface. The displayed multimedia content outline may be editable. In other words, the computing device 120 may receive an edit operation of the user for the multimedia content outline in the information display area in the dialogue interface, and display the edited or adjusted multimedia content outline based on the received edit operation.

In some embodiments, the computing device 120 may send the received edit operation for the multimedia content outline to the intelligent model 112, so that the intelligent model 112 adjusts the multimedia content outline based on the edit operation of the user. The computing device 120 may obtain the multimedia content outline adjusted by the intelligent model 112, and display the adjusted multimedia content outline in the information display area in the dialogue interface. In some embodiments, the user may perform the edit operation on the multimedia content outline for a plurality of times, to obtain a multimedia outline that meets a requirement.

In some embodiments, the intelligent model 112 may further adjust its parameter based on the edit operation of the user, to provide, in a subsequent process of generating the multimedia content for the user, the user with generated content that better meets a requirement of the user.

In addition, in some embodiments, after the computing device 120 displays the generated multimedia content outline in block 204, the user determines, by browsing the generated multimedia content outline, that a multimedia content outline currently displayed in the dialogue interface has met the requirement of the user and the multimedia content outline may not be edited.

In some embodiments, when the user determines that a multimedia content outline on which an edit operation is performed or a multimedia content outline on which no edit operation is performed has met a requirement, the user may tap or touch a control for generating multimedia content, to send a multimedia generation instruction for generating the multimedia content the computing device 120. The computing device 120 may send the instruction to the intelligent model 112, so that the intelligent model 112 generates the corresponding multimedia content based on the multimedia content outline on which an edit operation is performed or the multimedia content outline on which no edit operation is performed. The computing device 120 (for example, an application program installed in the computing device 120) may obtain the generated multimedia content from the intelligent model 112, and display the multimedia content.

In some embodiments, a level of the generated multimedia content corresponds to a level of the outline, and content at each level of the multimedia content is generated based on a corresponding description at the level of the outline. For example, the generated multimedia content being content of text is taken as an example. All parts at each level in the text respectively correspond to all parts at each level in the outline, and content of all the parts at each level in the text is generated based on the description of all the parts at each level in the outline. The generated multimedia content being content of a video image is taken as an example. The video image may be divided into a plurality of levels based on a content dimension. All parts at each level in the video image respectively correspond to all parts at each level in the outline, and content of all the parts at each level in the video image is generated based on the description of all the parts at each level in the outline. That the generated multimedia content is content of audio is taken as an example. The content of the audio may be similarly divided into a plurality of levels based on a content dimension. All parts at each level in the audio respectively correspond to all parts at each level in the outline, and content of all the parts at each level in the audio is generated based on the description of all the parts at each level in the outline. In addition, the generated multimedia content may alternatively correspond to the multimedia content outline based on another dimension, which is not limited in the present disclosure.

In some embodiments, in response to the received multimedia generation instruction, the computing device 120 may make a jump from the dialogue interface to a multimedia content editing interface, and display the obtained multimedia content in the multimedia content editing interface, so that the user can perform the edit operation on the multimedia content. In some embodiments, the generated multimedia content may include one or more of the following types: text, image, or audio, and different types of multimedia content may be displayed in multimedia content editing interfaces of the corresponding types. For example, the multimedia content may include a document with text information. Correspondingly, a generated document may be displayed in a document editing interface. The multimedia content may further include image content (for example, a still image or a video image) with image information. Correspondingly, the generated image content may be displayed in an image editing interface. The multimedia content may include multimedia content with audio information. Correspondingly, the generated audio content may be displayed in an audio editing interface.

Therefore, according to the interaction method for multimedia content in this embodiment of the present disclosure, the multimedia content outline can be provided for the user before the multimedia content is generated, and the user can perform the edit operation on the multimedia content outline in a user-friendly interaction interface, to obtain multimedia content that meets a personalized requirement of the user and further improve user experience. For example, the user may perform the edit operation on the displayed multimedia content outline in the dialogue interface, and further perform the edit operation on the generated multimedia content in the multimedia content editing interface. The user is provided with a friendly interface in which the edit operation can be performed, to fully use a processing capability of the intelligent model 112 through the interaction operation, thereby providing content that meets a need and a personalized requirement of the user in a content generation process, and further improving user experience.

The following describes a process of interaction for multimedia content with reference to FIG. 3A to FIG. 3F. FIG. 3A to FIG. 3F are schematic diagrams of example processes of interaction for multimedia content according to an embodiment of the present disclosure. FIG. 3A to FIG. 3F are schematic diagrams of an interaction interface 300, in a process of generating multimedia content, of an application program installed in a computing device 120 for invoking an intelligent model 112 according to an embodiment of the present disclosure. It may be understood that the interaction interface in FIG. 3A to FIG. 3F is merely an example. Based on different types of the computing device 120, the interaction interface 300 may be correspondingly displayed to adapt to a corresponding type.

Figure 3A:
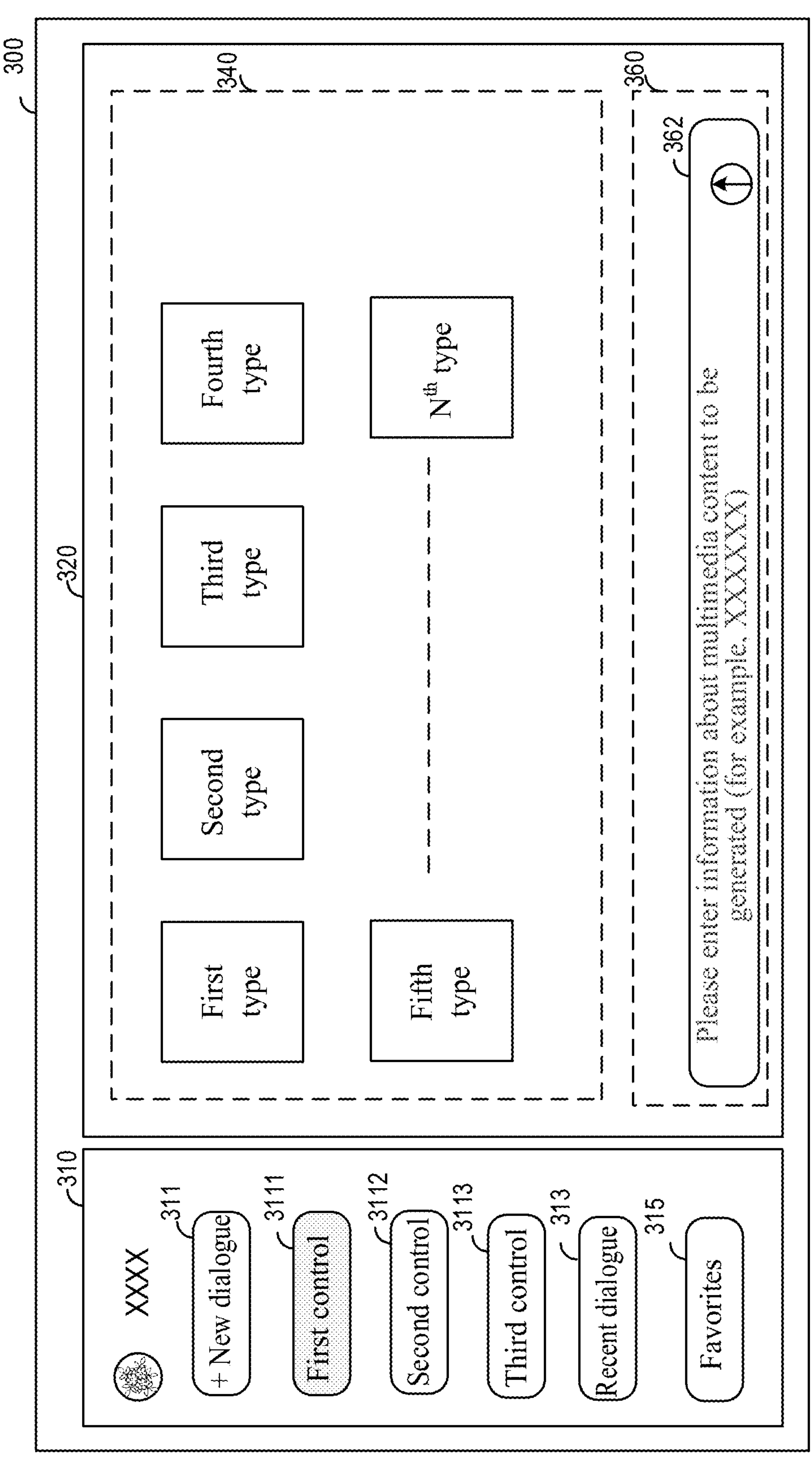
FIG. 3A to FIG. 3F are schematic diagrams of example processes of interaction for multimedia content according to an embodiment of the present disclosure.

FIG. 3A is a schematic interface diagram 300 of a dialogue interface that is used for generating multimedia content and that is displayed by a computing device 120 based on a trigger operation. The schematic interface diagram 300 in FIG. 3A may include a control area 310 and a dialogue interface 320. A plurality of controls such as a first control 3111, a second control 3112, and a third control 3112 associated with an application program "XXXX" are shown in the control area 310. Each control may be used to trigger a corresponding function in the application program. For example, the first control 3111 may trigger generation of the multimedia content, the second control 3112 may trigger a search function, and the third control 3113 may trigger a translation function, or the like. Although three controls are shown in FIG. 3A, this is merely an example. A number of controls may vary according to a function type that may be supported by the application program. In some embodiments, a "New dialogue" control 311 in the control area 310 may be triggered to display a plurality of controls in the control area 310.

In addition, the control area 310 may further include a "Recent dialog" control 313 for displaying historical dialogue information and a "Favorites" control 315. It may be understood that other types of controls may alternatively be set in the control area 310 as needed, which is not limited in the present disclosure.

The computing device 120 displays the dialogue interface 320 in the interface 300 in response to triggering of the first control 3111 (for example, the first control 3111 corresponds to a function of generating multimedia content). The dialogue interface 320 may include an information display area 340 and an input area 360. Various information associated with generation of the multimedia content may be displayed in the information display area 340. The input area 360 includes a dialogue box 362, to receive information entered by a user, so as to further implement interaction with the user.

As shown in FIG. 3A, in response to a trigger operation for the first control 3111, the computing device 120 may determine that the function for generating multimedia content is enabled. Correspondingly, the computing device 120 displays the dialogue interface 320 in the interface 300. The computing device 120 may display prompt information for the user in the information display area 340 in the dialogue interface 320. In some embodiments, the prompt information may include a type or style of multimedia content to be generated, to facilitate selection of the user. Based on selection of the user for the type, the application program may use the intelligent model 112 to generate and display multimedia content corresponding to the selected type for the user.

Figure 3B:
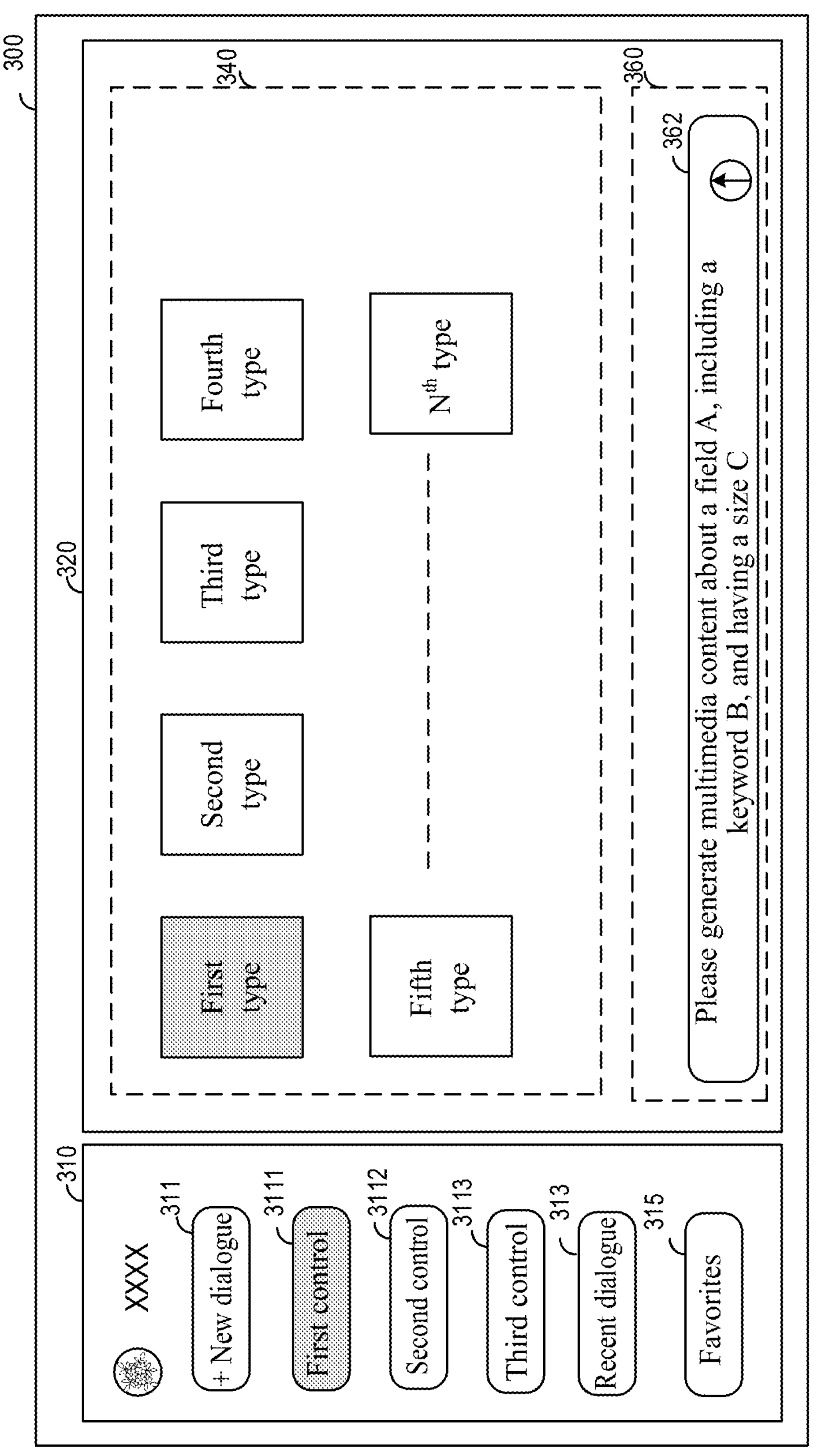

FIG. 3B is a schematic diagram in which a request for generating multimedia content is received in an input area 360 in a dialogue interface 320. FIG. 3B is taken as an example. The user selects a first type displayed in the information display area 340, and enters the request for generating multimedia content in the input area 360. In some embodiments, the request may include prompt information associated with the multimedia content to be generated. The prompt information may indicate related content (for example, a subject) of the multimedia content to be generated, an information size (which may be a number of characters when text information is taken as an example, may be resolution when image information is taken as an example, or the like), a keyword, an application field, or the like. For example, information about the request in FIG. 3B may be "Please generate multimedia content about a field A, including a keyword B, and having a size C".

The computing device 120 displays, in the dialogue interface 320, a multimedia content outline associated with multimedia content to be generated, in response to receiving the request for generating the multimedia content that is entered in FIG. 3B. In some embodiments, the multimedia content outline is editable. To be specific, the computing device 120 may receive an edit operation of the user for the multimedia content outline in the dialogue interface 320, and display an edited multimedia content outline.

Figure 3C:
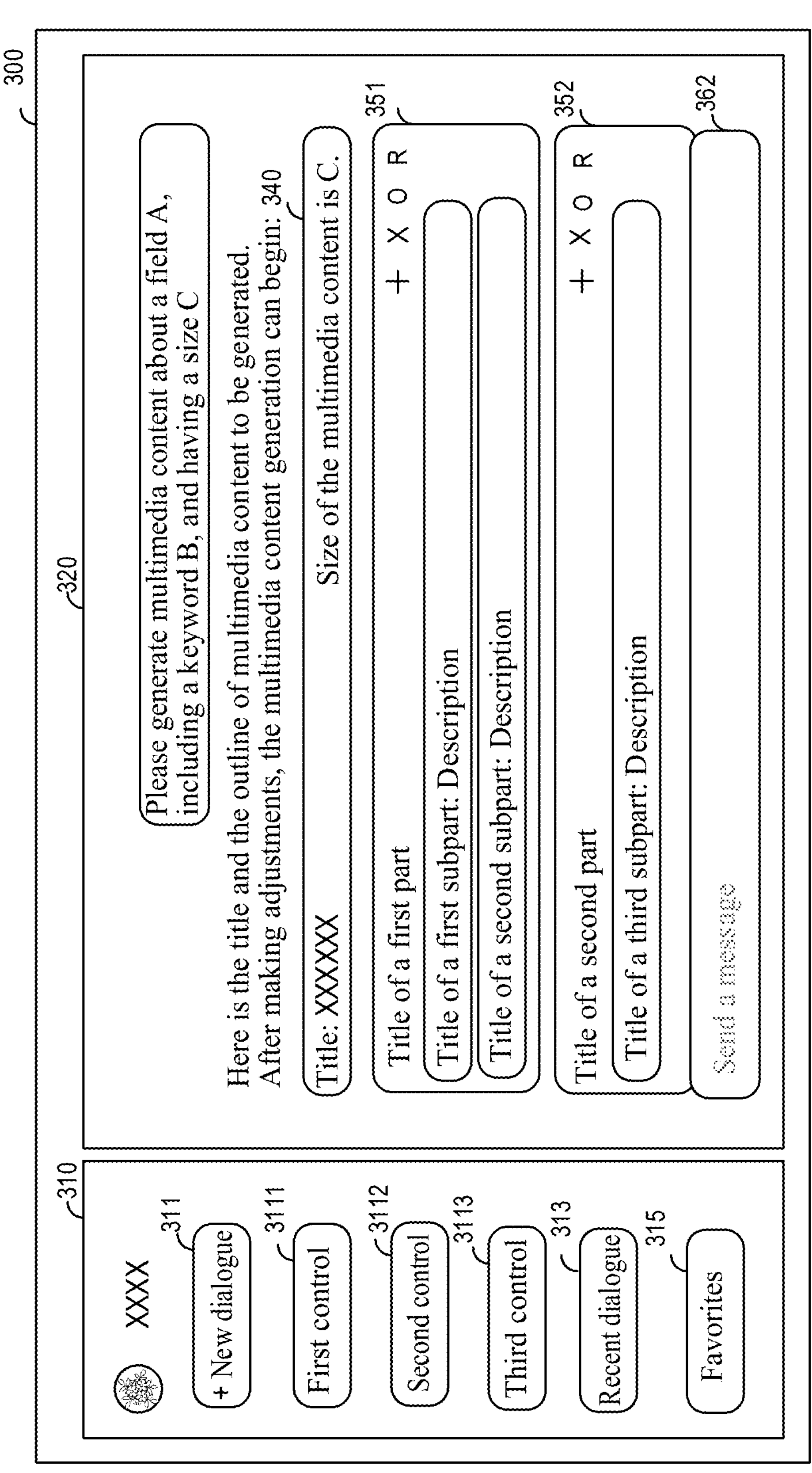
Figure 3D:
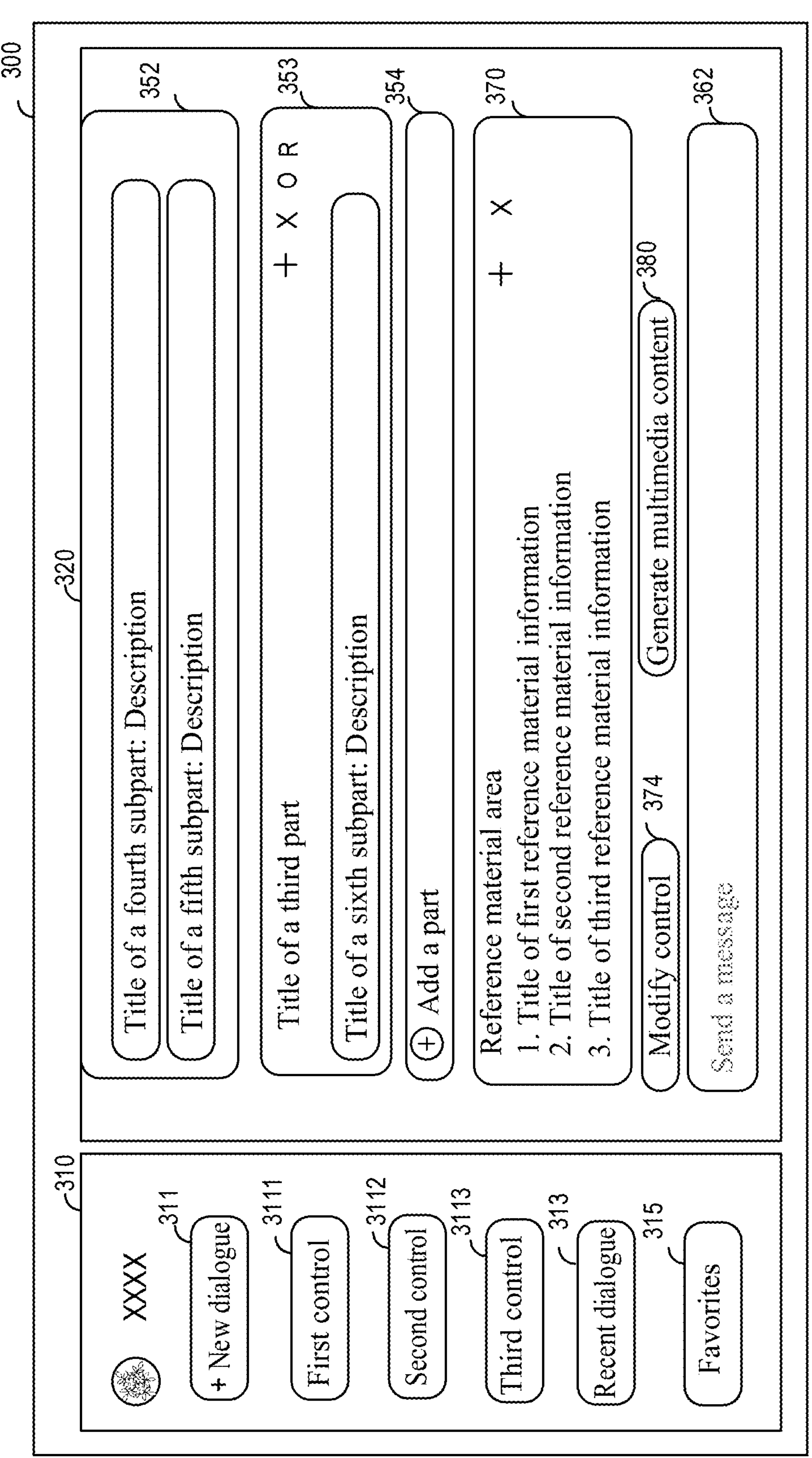

FIG. 3C and FIG. 3D are schematic diagrams of displaying an editable multimedia content outline in a dialogue interface 320 in response to receiving a request for generating multimedia content according to an embodiment of the present disclosure. FIG. 3C is a first schematic diagram of displaying a multimedia content outline in an interface 300. It can be seen from FIG. 3C that the dialogue interface 320 does not fully display the multimedia content outline due to a limitation of a length of the interface, and therefore, the user may continuously display the multimedia content outline in the interface 320 by performing an operation of an input device such as a mouse. As shown in FIG. 3D, a remaining part of a multimedia content outline is displayed in the dialogue interface 320.

In some embodiments, the multimedia content outline may include a plurality of levels, each level may include a plurality of parts, and each part at each level includes at least one corresponding subpart. The multimedia content outline shown in FIG. 3C and FIG. 3D is taken as an example. The multimedia content outline includes two levels. A first level includes three parts: a first part 351, a second part 352, and a third part 353. A second level includes: a first subpart and a second subpart in the first part 351, a third subpart, a fourth subpart, and a fifth subpart in the second part 352, and a sixth subpart in the third part 353. FIG. 3C shows only the third subpart in the second part 352, and FIG. 3D shows a remaining part of the multimedia content outline. It may be understood that the multimedia content outline in FIG. 3C and FIG. 3D is merely an example. The intelligent model 112 may generate, based on the prompt information of the multimedia content to be generated, a multimedia content outline that has a different number of levels and in which each level has a corresponding part and a subpart obtained through division.

In some embodiments, the multimedia content outline is editable. Correspondingly, the computing device 120 may display the edited multimedia content outline based on the edit operation of the user for the multimedia content outline in the dialogue interface 320. In some embodiments, the edit operation may include: adjusting at least one part at a corresponding level (for example, adding one or more new parts at the corresponding level; deleting one or more parts from the corresponding level; or regenerating one or more new parts at the corresponding level); adjusting at least one subpart of a corresponding part (for example, including: adding one or more new subparts to a corresponding part at a corresponding level; deleting one or more subparts of a corresponding part on which the edit operation is performed; or regenerating one or more new subparts in a corresponding part); adjusting an order of a plurality of subparts of a corresponding part on which the edit operation is performed; setting a content size of a corresponding part; or indicating to generate image in a corresponding part, and displaying, in the corresponding part, an attribute of the image to be generated, or the like.

Figure 3E:
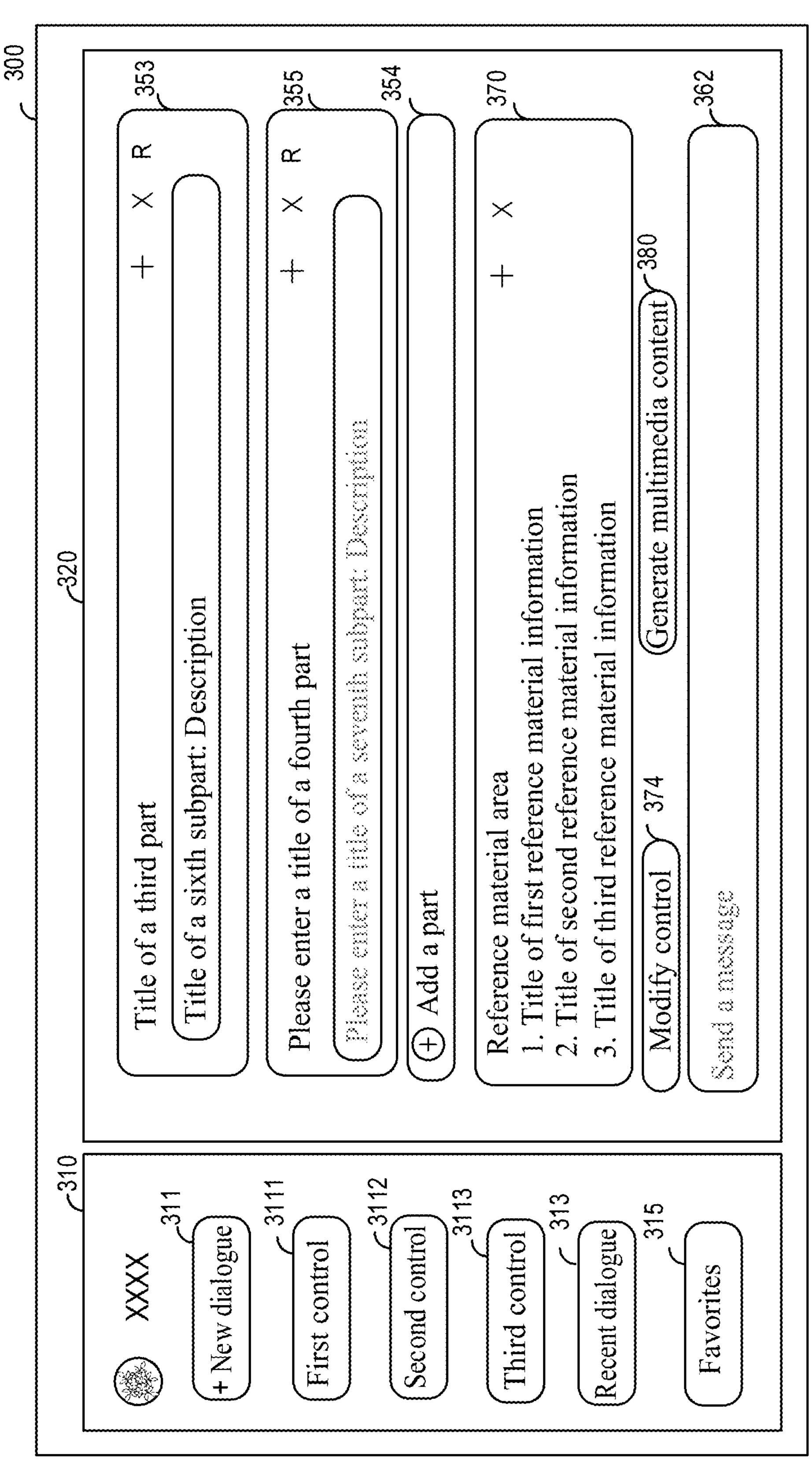

An example implementation of performing the edit operation on the multimedia outline is described below with reference to the accompanying drawings. FIG. 3E is a schematic interface diagram 300 of adding a new part at a corresponding level according to an embodiment of the present disclosure. In response to receiving a tap or touch operation of the user for an "Add a part" control in a part 354 in FIG. 3D, the computing device 120 displays a dialogue interface 320 after a new part 355 is added, as shown in FIG. 3E. In the new part 355, prompt information is displayed, to prompt the user to enter a title of the part. In some embodiments, the computing device 120 ranks a subpart (for example, a seventh subpart) in the new part based on the generated multimedia content outline, and prompts the user to enter a title and a description for the subpart. In addition, the added part 355 may be further provided with a control for setting a content size of the part.

In addition, a corresponding control is set, and the computing device 120 may further delete one or more parts from a corresponding level in response to a trigger operation of the user for the control. In some embodiments, a corresponding control is set, and the computing device 120 may further regenerate one or more new parts at a corresponding level in response to a trigger operation of the user for the control.

In some embodiments, the edit operation for the multimedia content outline may further include: adjusting at least one subpart of a corresponding part, for example, adding a new subpart to a corresponding part at a corresponding level. Each part shown in FIG. 3C and FIG. 3D is provided with a control for adding a subpart to the part, as shown by "+" in FIG. 3C and FIG. 3D. In response to tapping or triggering of the control for adding a subpart, the computing device 120 may add a subpart in a corresponding part, and display prompt information that is set for the subpart. The present disclosure sets no limitation on a specific implementation.

In some embodiments, the adjusting at least one subpart of a corresponding part may further include: deleting a subpart of a corresponding part on which the edit operation is performed. For example, each part shown in FIG. 3C and FIG. 3D is provided with a control for deleting a subpart from the part, as shown by "×" in FIG. 3C and FIG. 3D. In response to tapping or triggering of the control for deleting a subpart, the computing device 120 may delete a pre-selected subpart from the corresponding part.

In some embodiments, the adjusting at least one subpart of a corresponding part may further include: regenerating one or more updated subparts in a part on which the edit operation is performed. For example, each part shown in FIG. 3C and FIG. 3D is provided with a control for regenerating a subpart in the part, as shown by "R" in FIG. 3C and FIG. 3D. In response to tapping or triggering of the control "R" for regenerating a subpart, the computing device 120 may regenerate an updated subpart in the corresponding part. In some embodiments, in response to triggering of the control "R" for regenerating a subpart, the computing device 120 may send a request to regenerate a subpart of the part to the intelligent model 112, so that the intelligent model 112 regenerates the subpart of the part, and the computing device 120 displays the regenerated subpart to the user. In some embodiments, the regenerated subpart may have a different number, title, description, or the like from a previous subpart.

In some embodiments, the edit operation for the multimedia content outline may further include: adjusting an order of a plurality of subparts of a part on which the edit operation is performed. For example, each part shown in FIG. 3C and FIG. 3D is provided with a control for adjusting a sequence of a subpart of the part in the part, as shown by "O" in FIG. 3C and FIG. 3D. In response to tapping or triggering of the control "O" for ranking a subpart, the computing device 120 may re-rank all subparts of the part in the corresponding part, and display the re-ranked subparts in a current part.

In some embodiments, the edit operation for the multimedia content outline may further include: setting a content size of a corresponding part. The content size may be measured in different manners based on a type of the multimedia content. Text is taken as an example. The content size may include a number of characters in the text. Image is taken as an example. The content size may include resolution of the image, or the like. In some embodiments, the computing device 120 may provide, in each part, the user with a control for setting a corresponding content size. The computing device 120 may set a size of multimedia content in a corresponding part in response to control of the user for the control. For example, that the control is a control of a slide type is taken as an example for description. The content size may be increased based on a currently set content size in response to that the user slides the control in a first direction. The content size may be reduced based on a currently set content size in response to that the user slides the control in a second direction opposite to the first direction. The content size of the corresponding part may alternatively be adjusted in another manner, which is not limited in the present disclosure.

Figure 3F:
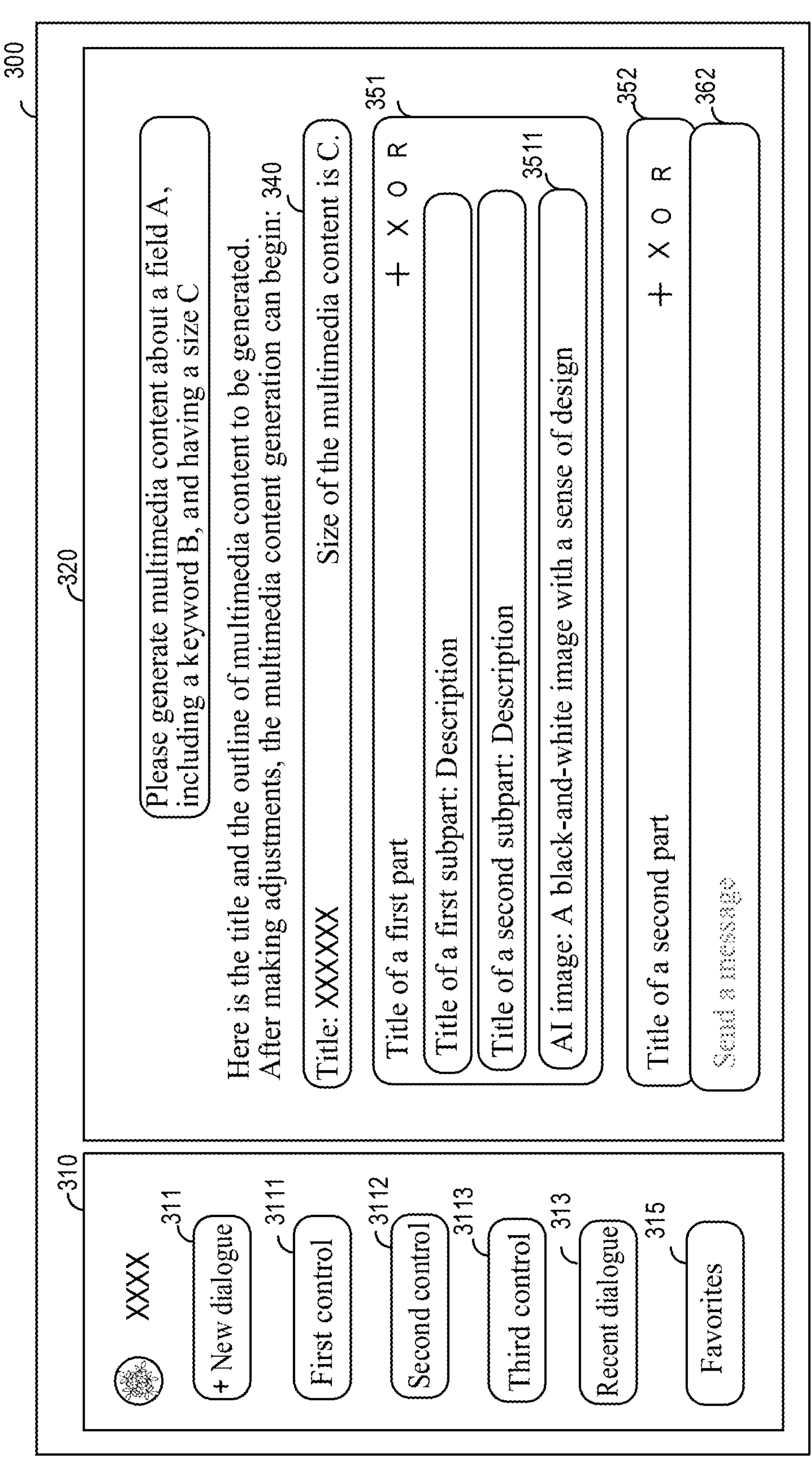

In some embodiments, the edit operation for the multimedia content outline may further include: indicating to generate image in a corresponding part, and further displaying, in the corresponding part, an attribute of the image to be generated. In some embodiments, the corresponding part is further provided with a control for generating image in the part. The computing device 120 may display, in the corresponding part, the attribute of the image to be generated, in response to receiving a trigger operation of the user for the control. This attribute may include but is not limited to a description of the image or an image size. In some embodiments, the image may be generated by the intelligent model 112 based on displayed attribute information. FIG. 3F is a schematic diagram of an interface 300 indicating to generate image in a corresponding part according to an embodiment of the present disclosure. As shown in FIG. 3F, in response to receiving a trigger operation of the user for a control (not shown) for generating image in the first part 351, the computing device 120 may display, in an image attribute information display area 3511 in the first part 351, the attribute of the image (for example, an AI image) to be generated, for example, "a black-and-white image with a sense of design" shown in FIG. 3F.

The edit operation for the multimedia content outline according to an embodiment of the present disclosure is described above with reference to the accompanying drawings. It may be understood that the above edit operation is merely an example. A corresponding edit operation may be set as needed, which is not limited in the present disclosure.

Back to FIG. 3E. FIG. 3E shows a control 380 "Generate multimedia content". In some embodiments, after the user completes the edit operation for the multimedia content outline, the user may trigger the control 380 to send a multimedia generation instruction, to start generation of the multimedia content. In some embodiments, in response to the received multimedia generation instruction, the computing device 120 may obtain multimedia content generated based on the edited multimedia content outline, and display the generated multimedia content. For example, the computing device 120 may send the received multimedia generation instruction to the intelligent model 112, obtain the multimedia content generated by the intelligent model 112 based on the edited multimedia content outline, and display the obtained multimedia content.

In some embodiments, when the multimedia content outline generated by the intelligent model 112 meets a user requirement, the user may not edit the multimedia content outline, but instead, obtain the generated multimedia content directly based on the generated multimedia content outline. As shown in FIG. 3D, the user may perform a tap or touch operation on the control 380 “Generate multimedia content” shown in FIG. 3D without editing the multimedia content outline, to start generation of the multimedia content. The intelligent model 112 may generate the multimedia content based on a multimedia content outline that is not edited. Correspondingly, the computing device 120 may obtain the multimedia content generated by the intelligent model 112, and display the multimedia content.

In some embodiments, in addition to generation of the multimedia content outline, a title recommendation 340 for the multimedia content to be generated may be provided in the dialogue interface 320 (as shown in FIG. 3C and FIG. 3F). In some embodiments, the title may also be edited.

As shown in FIG. 3D and FIG. 3E, a modify control 374 may be further set in the dialogue interface 320. The modify control 374 may be used to indicate a further modification to the outline and/or the title. For example, the modify control 374 may include: a control that indicates to further increase an outline length, “Change a title recommendation”, “Further search, and update multimedia content outline”, or the like.

In some embodiments, the intelligent model 112 may search, based on the request for generating the multimedia content, a material information set for material information matching the prompt information in the request for generating multimedia content, and generate the multimedia content outline based on the found material information. The intelligent model 112 may alternatively generate the multimedia content outline based on the request for generating multimedia content. The computing device 120 may obtain the multimedia content outline generated based on the request or the found material information.

In some embodiments, when the intelligent model 112 searches for the material information, the intelligent model 112 may further provide the found material information to the computing device 120, so that the computing device 120 can obtain material information related to the multimedia content to be generated. In some embodiments, the computing device 120 may display title information of the obtained material information in a reference material area 370 of the dialogue interface 320. As shown in FIG. 3E, the reference material area 370 may be displayed adjacent to the multimedia content outline. A title of the material information that is associated with the multimedia content to be generated and that is obtained by the computing device 120 is shown in the reference material area 370, for example, “Title of first reference material information”, “Title of second reference material information”, and “Title of third reference material information” in the area 370 shown in FIG. 3E. In addition, the computing device 120 may further display various other information related to a corresponding reference material in the reference material area 370, to facilitate browsing by the user.

In some embodiments, reference material information displayed in the reference material area 370 may further include material information uploaded by the user. In some embodiments, the reference material area 370 may be further provided with a control for updating display of reference material information, for example, a control for adding reference material information and a control for deleting reference material information. The computing device 120 may update display of the reference material area in response to receiving an update operation for the reference material area 370. For example, the computing device 120 may display a title of added reference material information in the reference material area 370 in response to an addition operation for reference material information.

In addition, in response to a deletion operation for reference material information, the computing device 120 may display, in the reference material area 370, a title of remaining reference material information after a title of corresponding reference material information is deleted.

In some embodiments, the computing device 120 may display an updated reference material area 370. In addition, the computing device 120 may further send updated reference material information to the intelligent model 112, so that the model 112 updates the multimedia content outline based on the updated reference material information. Correspondingly, the computing device 120 may display an updated multimedia content outline.

In some embodiments, in response to the received multimedia generation instruction, the computing device 120 may make a jump from the dialogue interface 320 to the multimedia content editing interface, and display the generated multimedia content in the multimedia content editing interface. In some embodiments, a type of the generated multimedia content may include one or more of the following types: text, image, or audio, and correspondingly, different types of multimedia content are correspondingly displayed in multimedia content editing interfaces of the corresponding types.

Figure 4A:
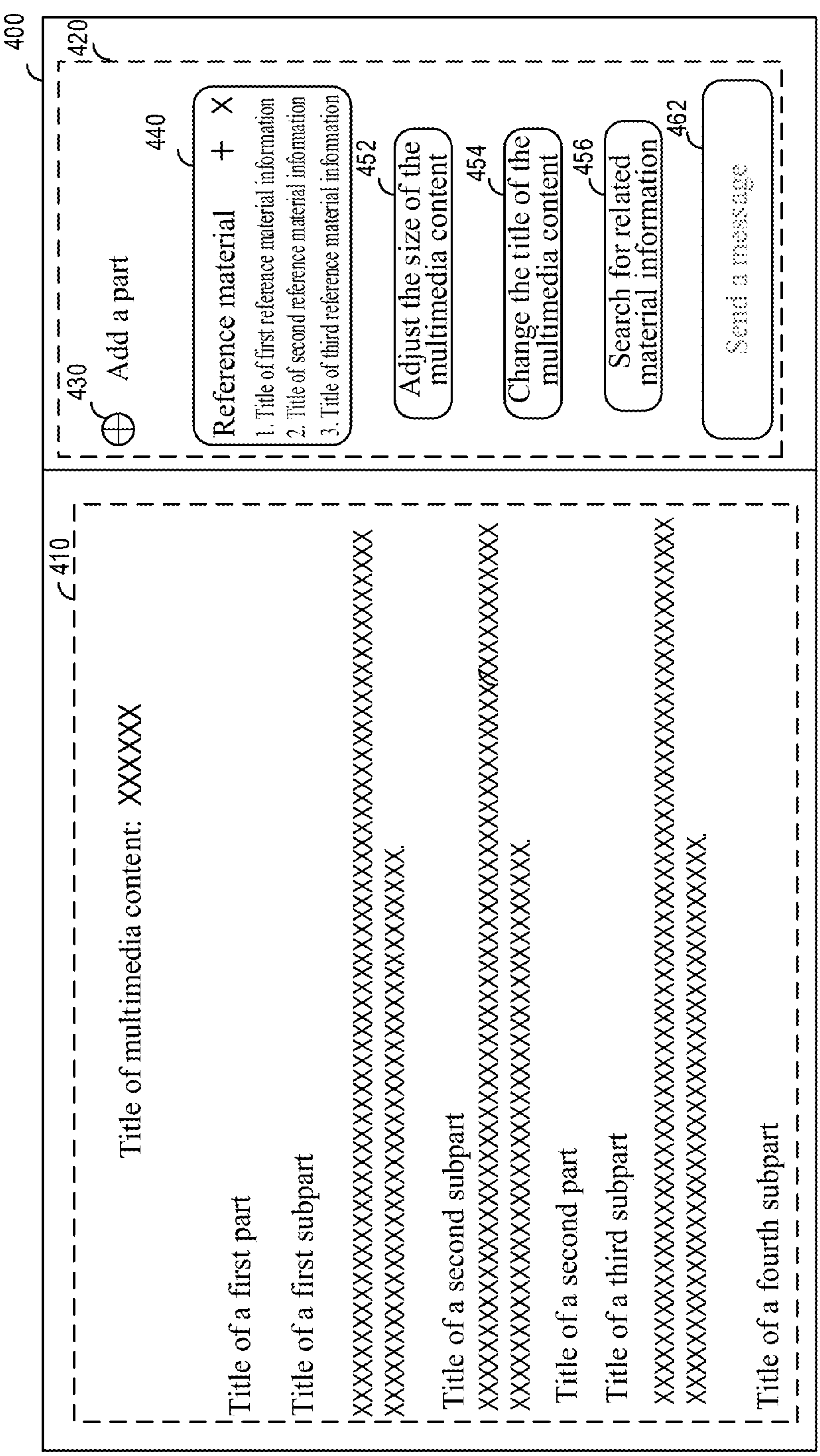
FIG. 4A to FIG. 4D are schematic diagrams of example processes of editing multimedia content in an editing interface for displaying multimedia content of a text type according to an embodiment of the present disclosure.

FIG. 4A to FIG. 4D are schematic diagrams of example processes of editing multimedia content in an editing interface for displaying multimedia content of a text type according to an embodiment of the present disclosure. FIG. 4A is a schematic diagram 400 after a jump from a dialogue interface 320 in FIG. 3E or FIG. 3D to a multimedia text content editing interface 410 in response to a multimedia generation instruction. The interface 400 shown in FIG. 4A may include the multimedia content editing interface area 410 and a control area 420. Generated text content, for example, text content generated based on the multimedia content outline in FIG. 3E or FIG. 3D, may be displayed in the multimedia content editing interface area 410. Correspondingly, a title of multimedia content, a title of a first part, a title of a first subpart, a title of a second subpart, a title of a second part, a title of a third subpart, and the like are displayed in the multimedia content editing interface 410. In addition, corresponding text content is displayed below each subtitle. A structure of the generated text content corresponds to a level of a previously generated multimedia content outline.

As shown in FIG. 4A, the interface 400 may further include a control area 420, to display various controls to facilitate an operation by the user. The example in FIG. 4A is taken as an example for description. An “Add a part” control 430 may be included in the control area 420, to add a corresponding part to the generated multimedia content to adjust the generated content. In addition, the control area 420 may further include a control 452 “Adjust a size of the multimedia content”, a control 454 “Change a title of the multimedia content”, a control 456 “Search for related material information”, and the like. In some embodiments, the control area 420 may further include an input subarea 462, similar to the input area 362 in FIG. 3A to FIG. 3F, to receive information entered by the user, and start a new dialogue interface.

It may be understood that the controls shown in the control area 420 in FIG. 4A are merely examples. A person skilled in the art may configure various types of other controls in the control area 420 as needed, which is not limited in the present disclosure.

In some embodiments, the computing device 120 may display adjusted multimedia content in response to an edit operation received for the multimedia content in the multimedia content editing interface 410. In some embodiments, the computing device 120 may determine a part to be edited in the multimedia content in response to a selection operation for at least a part of the multimedia content, and may further display the adjusted multimedia content in response to an edit operation for the part to be edited.

Figure 4B:
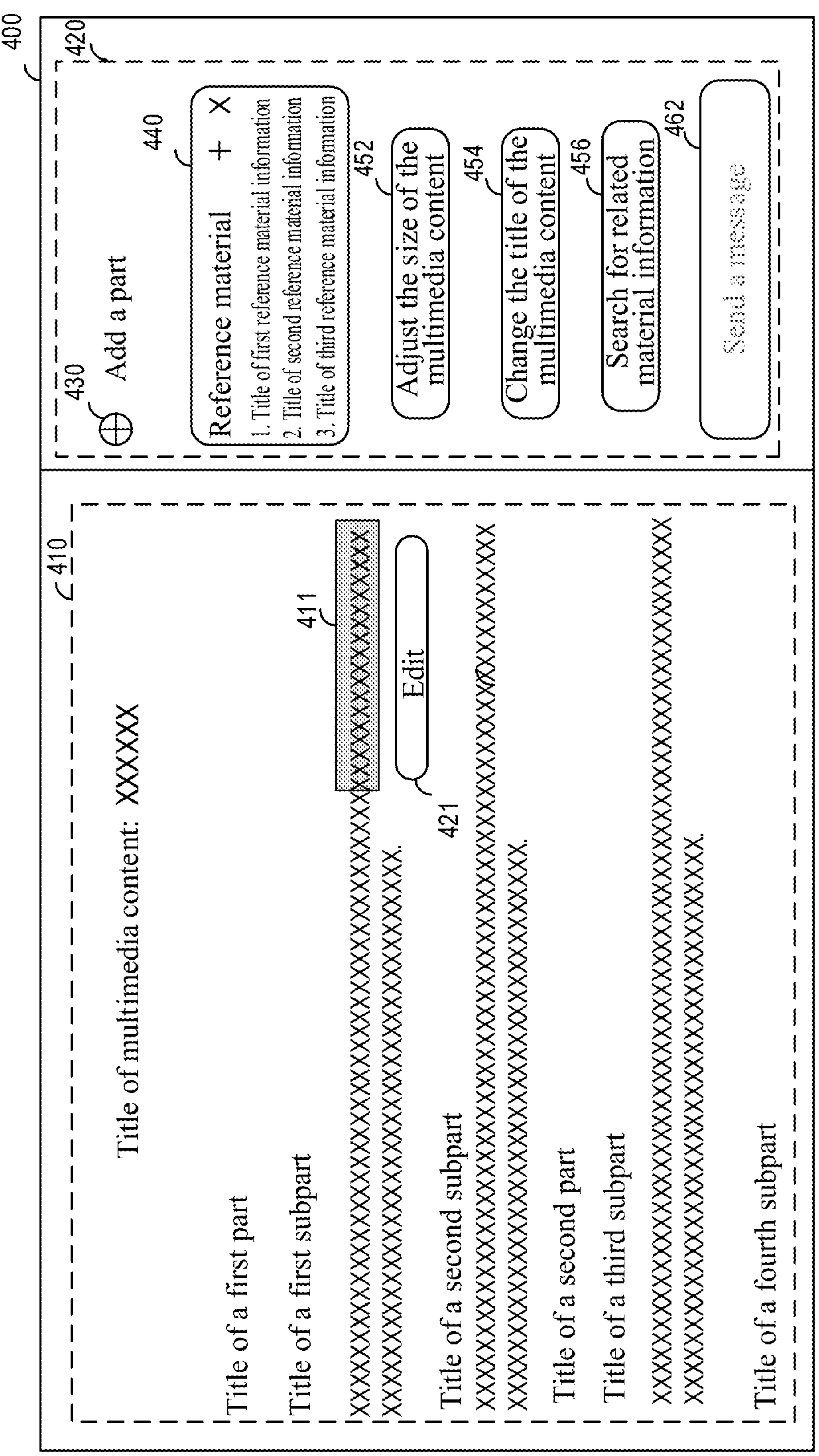

FIG. 4B is a schematic diagram of selecting a part to be edited in a multimedia content editing interface 410. The user can select, through box selection, the part 411 to be edited. The part to be edited may be highlighted to prompt the user. In addition, after the part 411 to be edited is determined, the computing device 120 may further display an edit operation selection box 421 in the multimedia content editing interface 410, to provide the user with an edit operation to be selected.

In some embodiments, in response to a trigger operation of the user for the edit operation selection box 421, the edit operation selection box 421 may be expanded into two parts: an instruction input box 422 and an operation selection box 424. The instruction selection input box 422 may be used to receive an instruction entered by the user or information such as a search or an inquiry. Edit operations in various manners are listed in the operation selection box 424, to facilitate selection by the user.

Figure 4C:
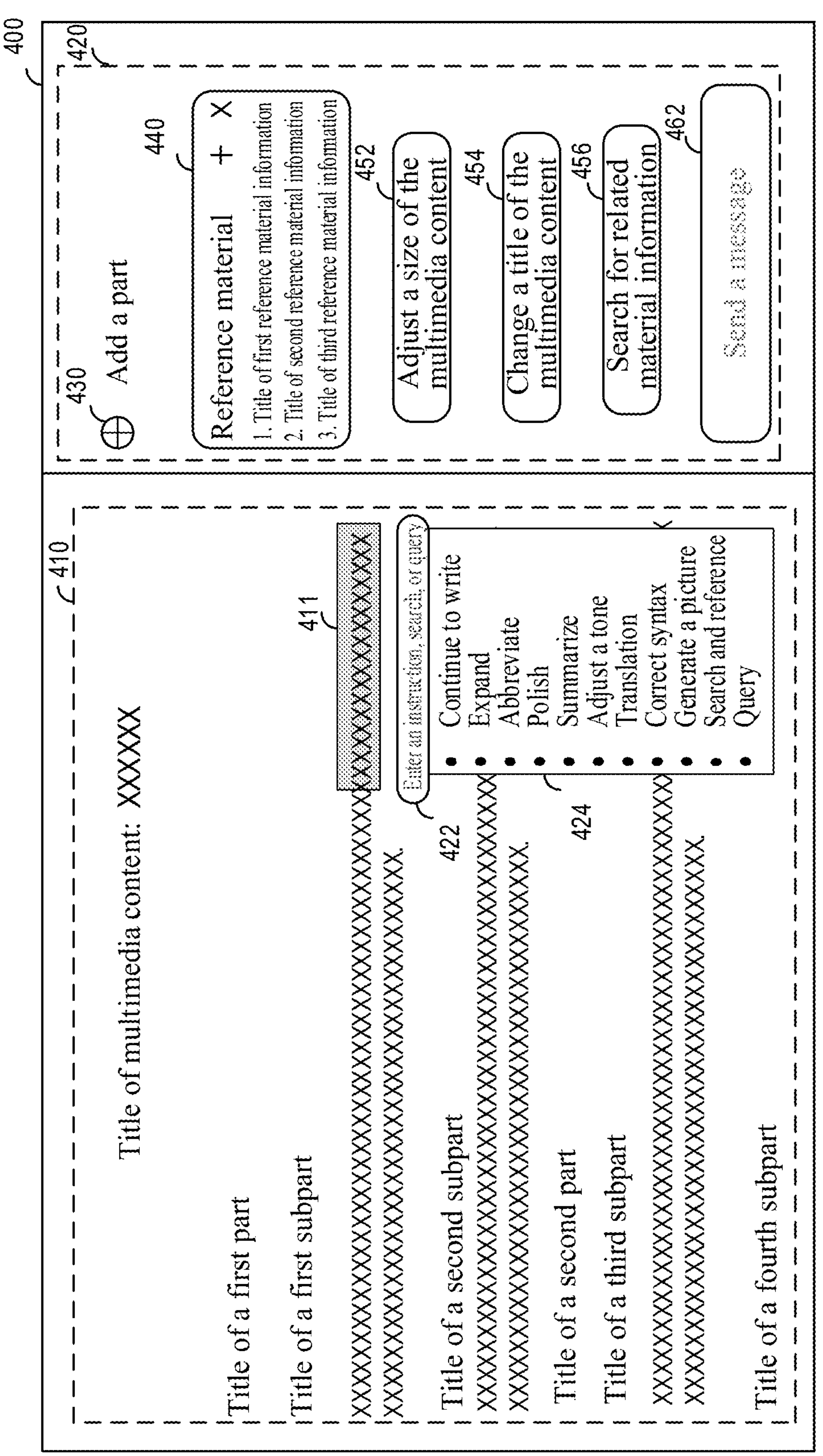

FIG. 4C is a schematic diagram of displaying the instruction input box 422 and the operation selection box 424 in response to the trigger operation of the user for the edit operation selection box 421. An operation listed in the operation selection block 424 in FIG. 4C is an operation for selected text content. The edit operation may include at least one of the following: continuing to write the part to be edited; expanding the part to be edited; abbreviating the part to be edited; polishing the part to be edited (for example, for the text content); generating, based on the part to be edited, content extraction corresponding to the part to be edited (for example, summarizing the part to be edited); adjusting a tone of the part to be edited; translating the part to be edited; correcting syntax of the part to be edited; or generating image based on the part to be edited, or the like. In addition, the operation selection box 424 may further include a search and reference operation, an inquiry operation, or the like.

In some embodiments, the computing device 120 may send, to the intelligent model 112, an edit operation (for example, "Expand") instruction selected by the user, so that the intelligent model 112 edits, based on the edit operation instruction of the user, the part to be edited. The intelligent model 112 may send, to the computing device 120, content on which the edit operation is performed, and display the content.

In some embodiments, the computing device 120 may display information after the edit operation in a pop-up box in response to the edit operation for the part to be edited. The computing device 120 may insert the information after the edit operation into the multimedia content or replace the part to be edited in the multimedia content in response to a trigger operation for a first control in the pop-up box.

Figure 4D:
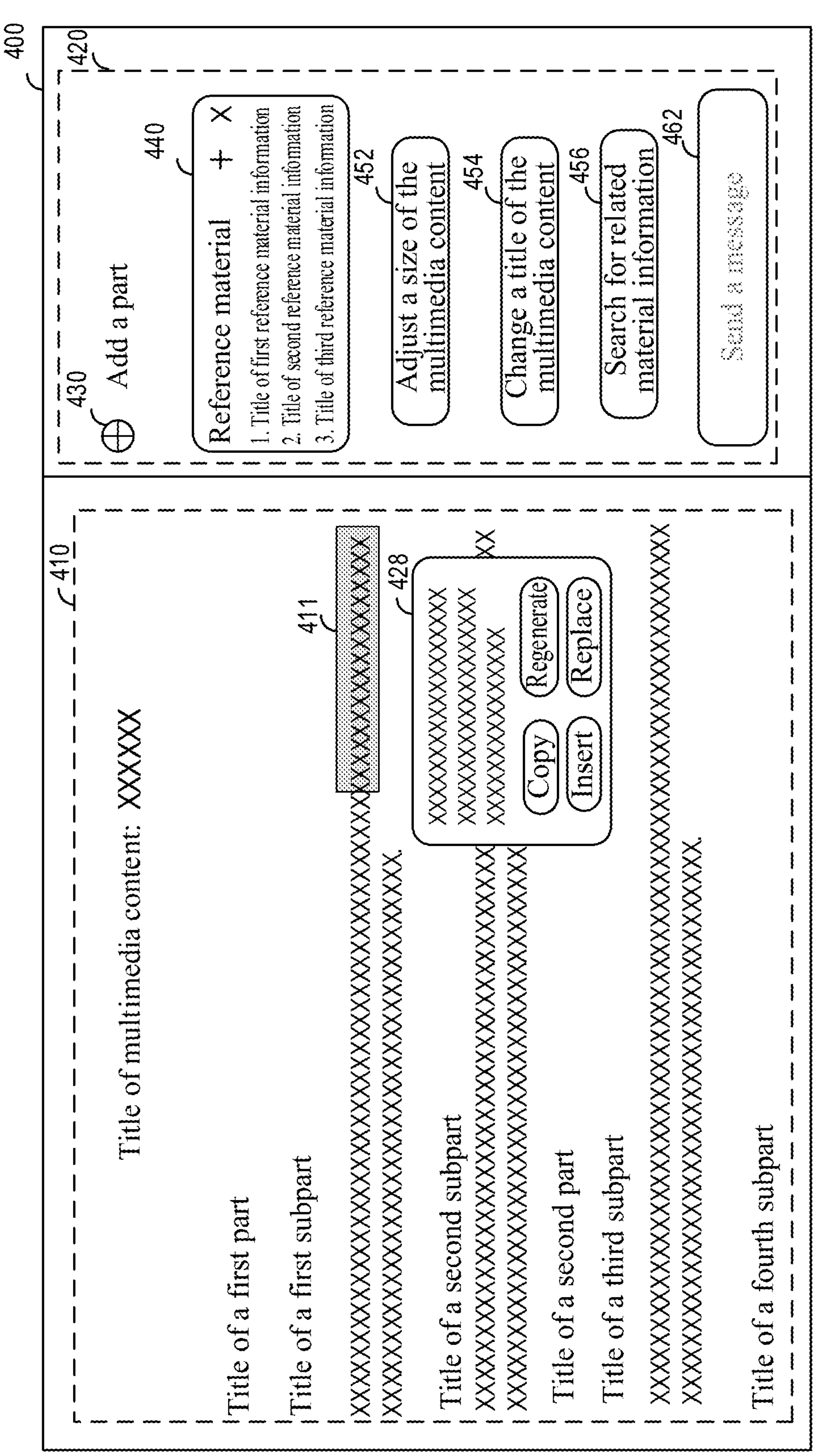

FIG. 4C is taken as an example for description. The computing device 120 enters an interface in FIG. 4D in response to receiving selection of the user for an "Expand" operation. FIG. 4D shows the interface 400 after the part 411 to be edited is expanded. A pop-up box 428 is displayed in the interface 400, and information after the edit operation (for example, "Expand") is shown in the pop-up box 428. The pop-up box 428 may be provided with various types of controls such as a "Copy" control, a "Regenerate" control, an "Insert" control, and a "Replace" control. The computing device 120 may process information displayed in the pop-up box 428, in response to selection of the user for a corresponding control. For example, in response to a trigger operation for the "Insert" control in the pop-up box 428, the computing device 120 may insert the information after the edit operation into the multimedia content (for example, after the part 411 to be edited). Alternatively, the computing device 120 may replace the part 411 to be edited in the multimedia content with the information after the edit operation in response to a trigger operation for the "Replace" control in the pop-up box 428.

In some embodiments, in response to a trigger operation for a second control in the pop-up box, the computing device 120 may reperform a corresponding edit operation (namely, a last selected edit operation) on the information displayed in the pop-up box. The computing device 120 may display, in the pop-up box, updated information after the edit operation is reperformed. This operation is performed, so that the user can be provided with convenience of reperforming the edit operation, to obtain multimedia content on which the edit operation is performed and that better meets a requirement.

FIG. 4D is taken as an example for description. The computing device 120 may reperform the "Expand" operation on the part 411 to be edited in response to a trigger operation for a "Regenerate" control in the pop-up box 428. For example, the computing device 120 may send an "Expand" instruction to the intelligent model 112 again, so that the intelligent model 112 edits, again based on the instruction, the part to be edited. The intelligent model 112 sends, to the computing device 120, content on which the edit operation is reperformed, and displays the content. Therefore, updated information after the edit operation is reperformed is displayed in the pop-up box 428. The user may perform the above operation for a plurality of times until multimedia content that meets a requirement is obtained.

An example process of editing the text content is described above with reference to FIG. 4A to FIG. 4D. It may be understood that the multimedia content may include various types, and correspondingly, a method in the embodiments of the present disclosure may be applied to various other types of multimedia content. The edit operation is performed on the generated multimedia content in the corresponding multimedia content editing interface.

A process of editing image content is described below with reference to FIG. 5A to FIG. 5D. FIG. 5A to FIG. 5D are schematic diagrams of example processes of editing multimedia content in an editing interface for displaying multimedia content of an image type according to an embodiment of the present disclosure. It may be understood that principles of performing the edit operation on various types of multimedia content are similar.

Figure 5A:
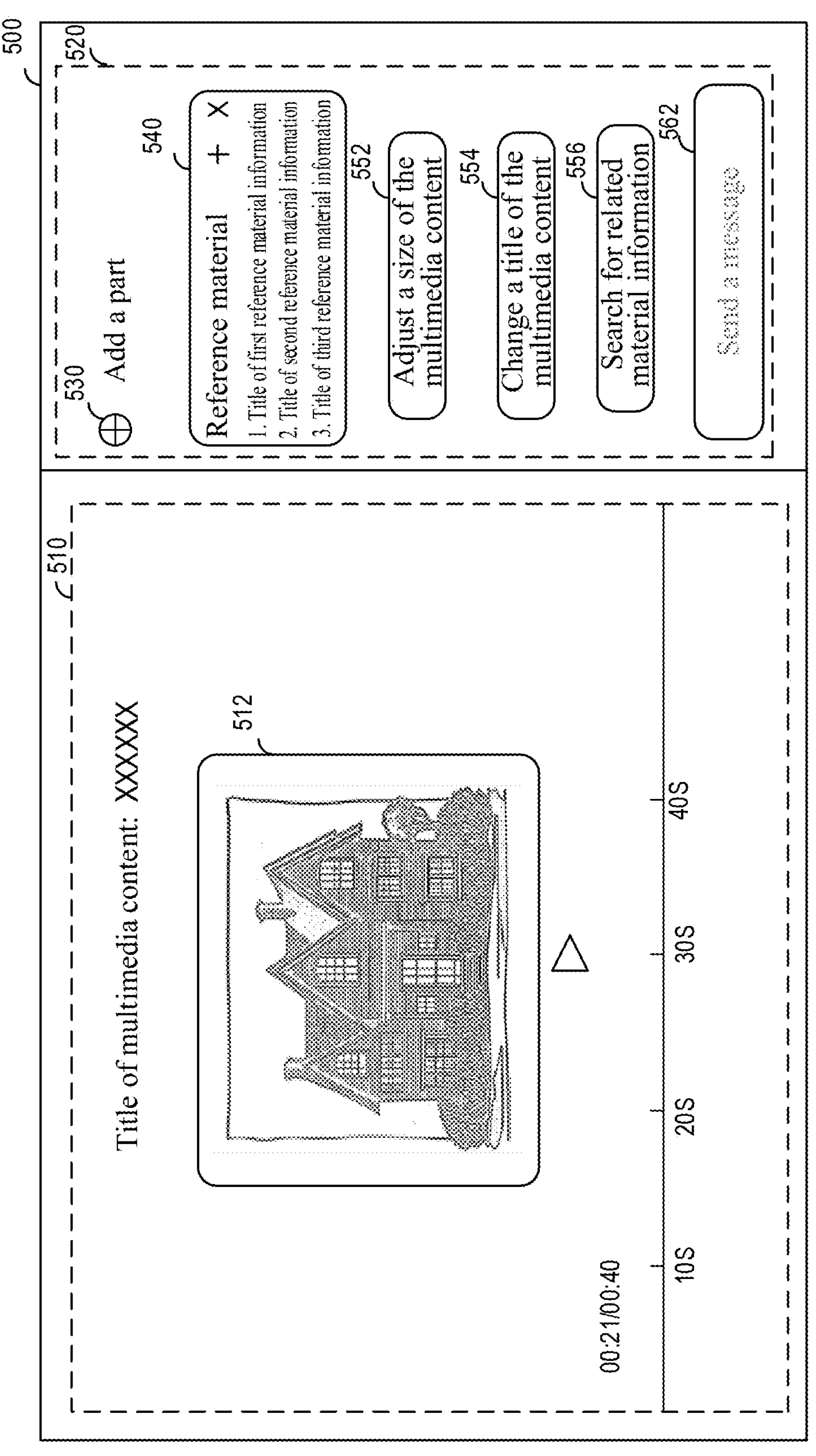
FIG. 5A to FIG. 5D are schematic diagrams of example processes of editing multimedia content in an editing interface for displaying multimedia content of an image type according to an embodiment of the present disclosure.

FIG. 5A shows a multimedia content editing interface 510 in which multimedia content of an image type is displayed. The image type in FIG. 5A includes a video image. FIG. 5A further shows a control area 520. The area is similar to the control area 420 in FIG. 4A to FIG. 4D. For an understanding of the area 520, references may be made to the above descriptions in FIG. 4A to FIG. 4D. For the sake of brevity, details are not described herein again.

In FIG. 5A, generated image content (for example, video content) is displayed in a player 512 in the multimedia content editing interface 510. In some embodiments, the video image may be divided into a plurality of levels based on a content dimension. All parts at each level in the video image respectively correspond to all parts at each level in the previously generated multimedia content outline, and content of all the parts at each level in the video image is generated based on the description of all the parts at each level in the outline. In some embodiments, a timeline associated with the generated video content may be further displayed in the multimedia content editing interface 510, to display a playing progress. In addition, the timeline may be further used to select the part to be edited.

Figure 5B:
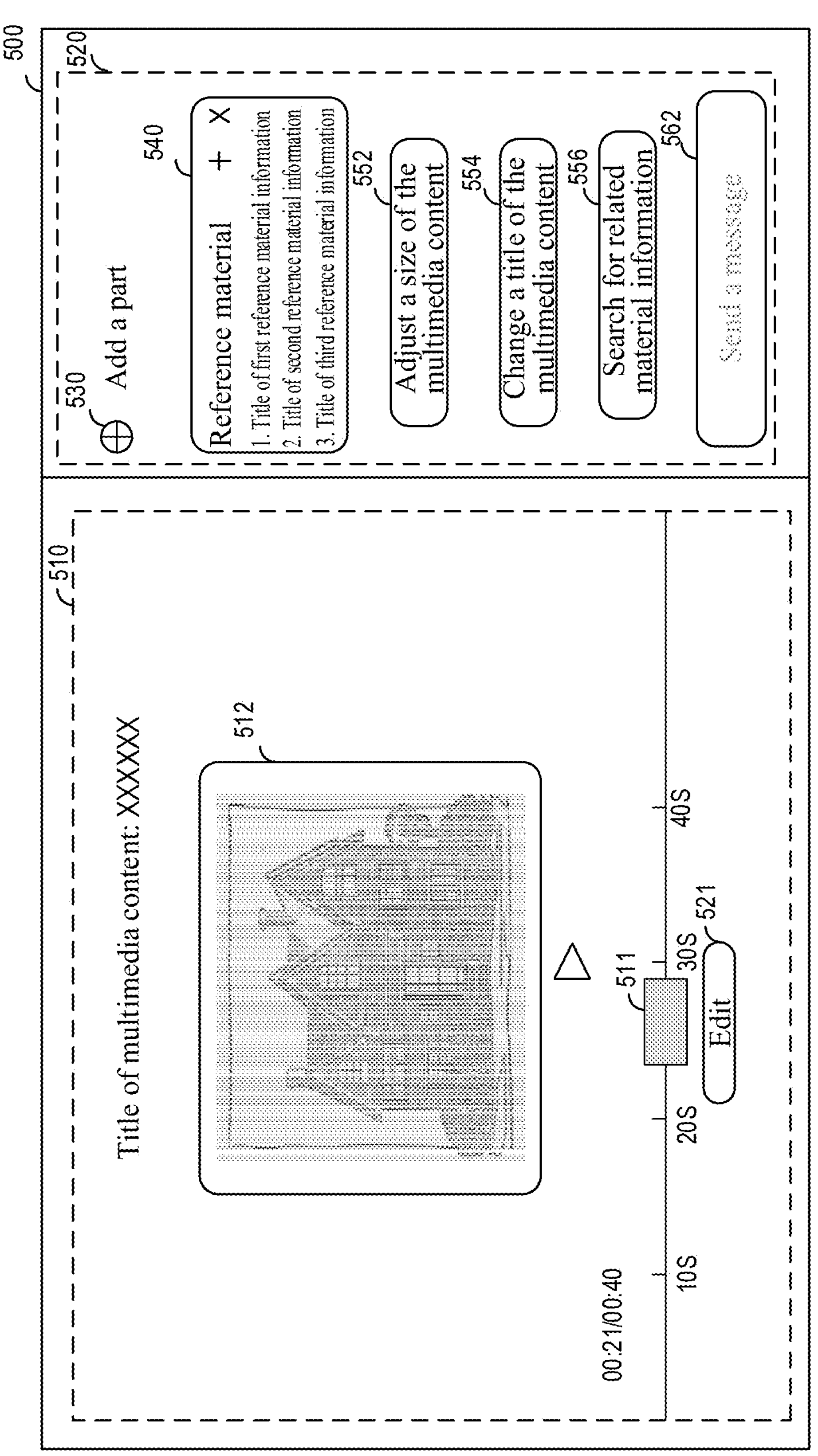

In some embodiments, the video content may be selected by operating the timeline. As shown in FIG. 5B, a corresponding time period may be selected on the timeline, and a video segment corresponding to the time period is considered as a part to be edited. For example, in FIG. 5B, the video segment corresponding to a time period 511 between 20 S and 30 S is selected as a part to be edited. Similar to FIG. 4B, the part to be edited may be highlighted to prompt the user. In addition, after the part to be edited is determined, an edit operation selection box 521 may be further displayed in the multimedia content editing interface 510, to provide the user with an edit operation that may be selected.

In some embodiments, in response to a trigger operation of the user for the edit operation selection box 521, the edit operation selection box 521 may be expanded into two parts: an instruction input box 522 and an operation selection box 524. The instruction selection input box 522 is used to receive an instruction entered by the user or information such as a search or an inquiry. Operations in various manners are listed in the operation selection box 524, to facilitate selection by the user.

Figure 5C:
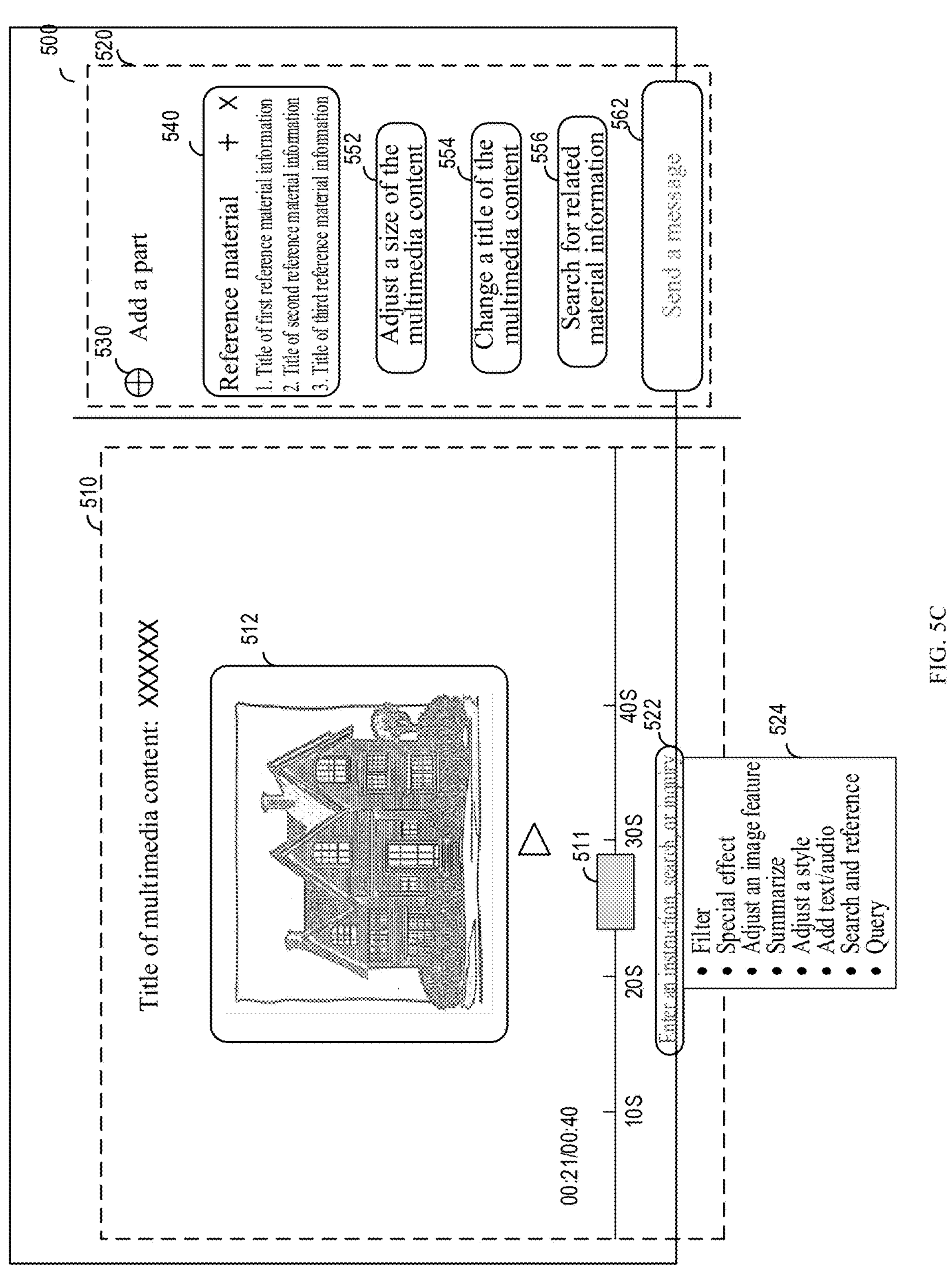

FIG. 5C is a schematic diagram of displaying the instruction input box 522 and the operation selection box 524 in response to the trigger operation of the user for the edit operation selection box 521. An edit operation listed in the operation selection block 524 in FIG. 5C is an operation for the image content. The edit operation may include at least one of the following: adjusting (including operations such as adding, modifying, and deleting) a filter of the part to be edited; adjusting (including operations such as adding, modifying, and deleting) a effect of the part to be edited; adjusting an image feature (for example, resolution, brightness, or texture) of the part to be edited; generating, based on the part to be edited, content extraction corresponding to the part to be edited (for example, summarizing the part to be edited); adding corresponding text content or audio content for the part to be edited; adjusting an image style of the part to be edited (for example, to a cartoon style or a painting style), or the like. In addition, the operation selection box 524 may further include a search and reference operation, an inquiry operation, or the like.

In some embodiments, the computing device 120 may send, to the intelligent model 112, an edit operation (for example, "Adjust a filter") instruction selected by the user, so that the intelligent model 112 edits, based on the edit operation instruction of the user, the part to be edited. The intelligent model 112 may send, to the computing device 120, content on which the edit operation is performed, and display the content.

In some embodiments, the computing device 120 may display information after the edit operation in a pop-up box in response to the edit operation for the part to be edited. The computing device 120 may insert the information after the edit operation into the multimedia content or replace the part to be edited in the multimedia content in response to a trigger operation for a first control in the pop-up box.

FIG. 5C is taken as an example for description. The computing device 120 enters an interface in FIG. 5D in response to receiving selection of the user for a "Filter" operation. An interface after the filter of the part to be edited is adjusted is displayed in the interface. A pop-up box 528 is displayed in the interface, and information after the edit operation (for example, "Adjust a filter") is shown in the pop-up box 528. The pop-up box 528 may be provided with various types of controls such as a "Copy" control, a "Regenerate" control, an "Insert" control, and a "Replace" control. The computing device 120 may process information displayed in the pop-up box 528, in response to selection of the user for a corresponding control. For example, in response to a trigger operation for the "Insert" control in the pop-up box 528, the computing device 120 may insert the information after the edit operation into the multimedia content (for example, after the part to be edited). Alternatively, the computing device 120 may replace the part to be edited in the multimedia content with the information after the edit operation in response to a trigger operation for the "Replace" control in the pop-up box 528.

In some embodiments, in response to a trigger operation for a second control in the pop-up box 528, the computing device 120 may reperform a corresponding edit operation (namely, a last selected edit operation) on the information displayed in the pop-up box. The computing device 120 may display, in the pop-up box, updated information after the edit operation is reperformed. This operation is performed, so that the user can be provided with convenience of reperforming the edit operation, to obtain multimedia content on which the edit operation is performed and that meets a requirement.

Figure 5D:
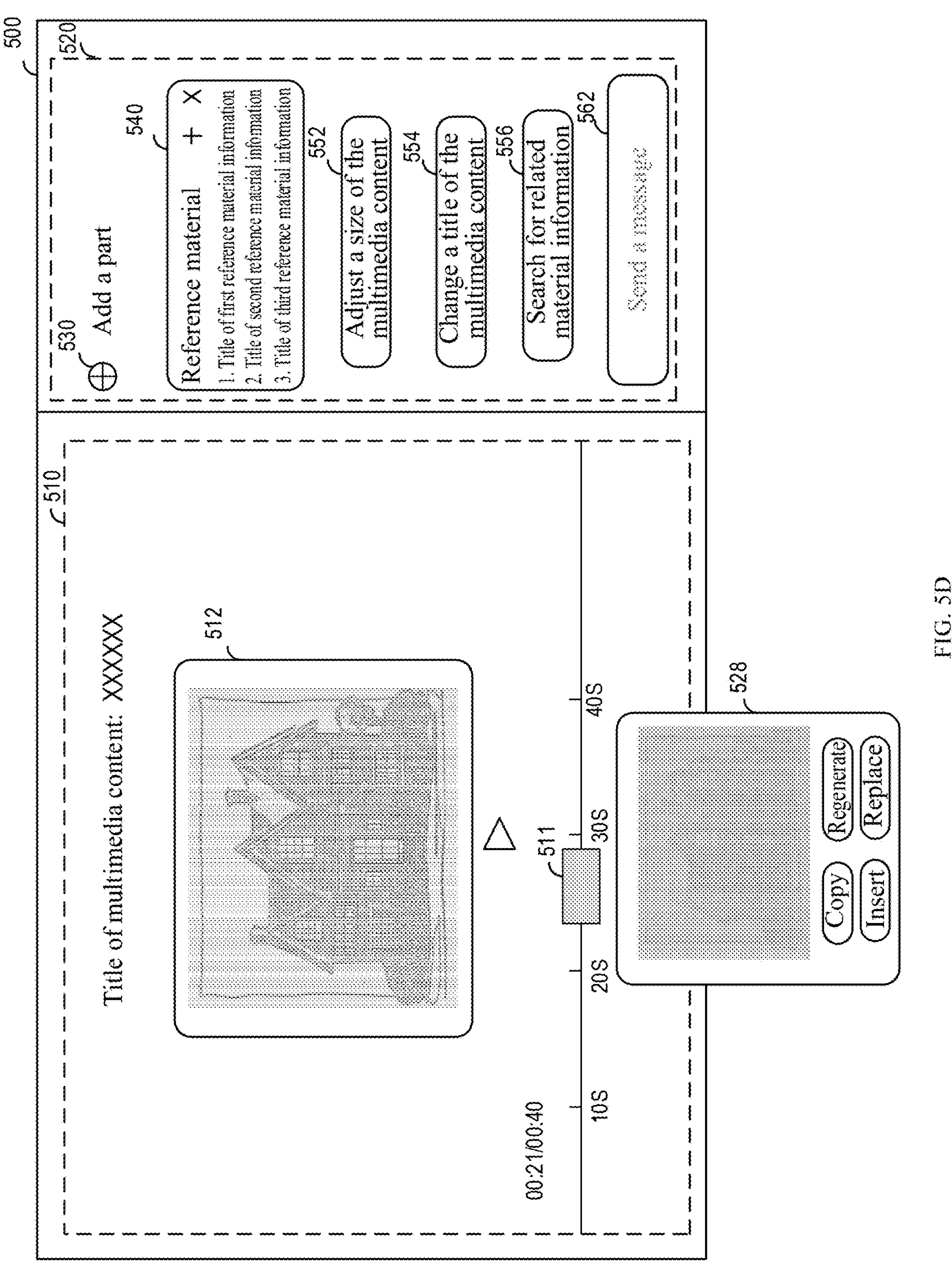

FIG. 5D is taken as an example for description. The computing device 120 may reperform the "Adjust a filter" operation on the part to be edited in response to a trigger operation for a "Regenerate" control in the pop-up box 528. For example, the computing device 120 may send an "Adjust a filter" instruction to the intelligent model 112 again, so that the intelligent model 112 edits the part to be edited again based on the instruction. The intelligent model 112 sends, to the computing device 120, content on which the edit operation is reperformed, and displays the content. Therefore, updated information after the edit operation is reperformed is displayed in the pop-up box 528. The user may perform the above operation for a plurality of times until multimedia content that meets a requirement is obtained.

The edit operations performed on the text content and the image content are respectively described above with reference to FIG. 4A to FIG. 4D and FIG. 5A to FIG. 5D. It may be understood that the edit operation may be similarly performed based on the type of the generated multimedia content described above. For an understanding of an edit operation for audio content and multimedia content of one or more types including an audio type, a text type, and an image type, references may be made to the above descriptions. For the sake of brevity, details are not described herein again.

In some embodiments, the computing device 120 may associate one or more parts of the generated multimedia content with the material information referenced during generation of the multimedia content, and display the associated material information in the reference material display area in the multimedia content editing interface.

Specifically, the computing device 120 may determine a part to be associated in the multimedia content based on a first selection operation of the user. The computing device 120 may further display, based on a received trigger identification, candidate material information associated with the part to be associated. In some embodiments, the computing device 120 may determine reference material information to be displayed in association with the part to be associated in the candidate material information, in response to a second selection operation of the user for the candidate material information; and display title information of the reference material information in a reference material display area of the multimedia content editing interface. In some embodiments, an index of the title information of the reference material information in the reference material display area is the same as an index of the part to be associated.

The following schematically describes, with reference to the accompanying drawings, example processes of displaying a part to be associated in multimedia content and material information in association. FIG. 6A to FIG. 6E are schematic diagrams of example processes of displaying a part to be associated in multimedia content and material information in association according to an embodiment of the present disclosure.

Figure 6A:
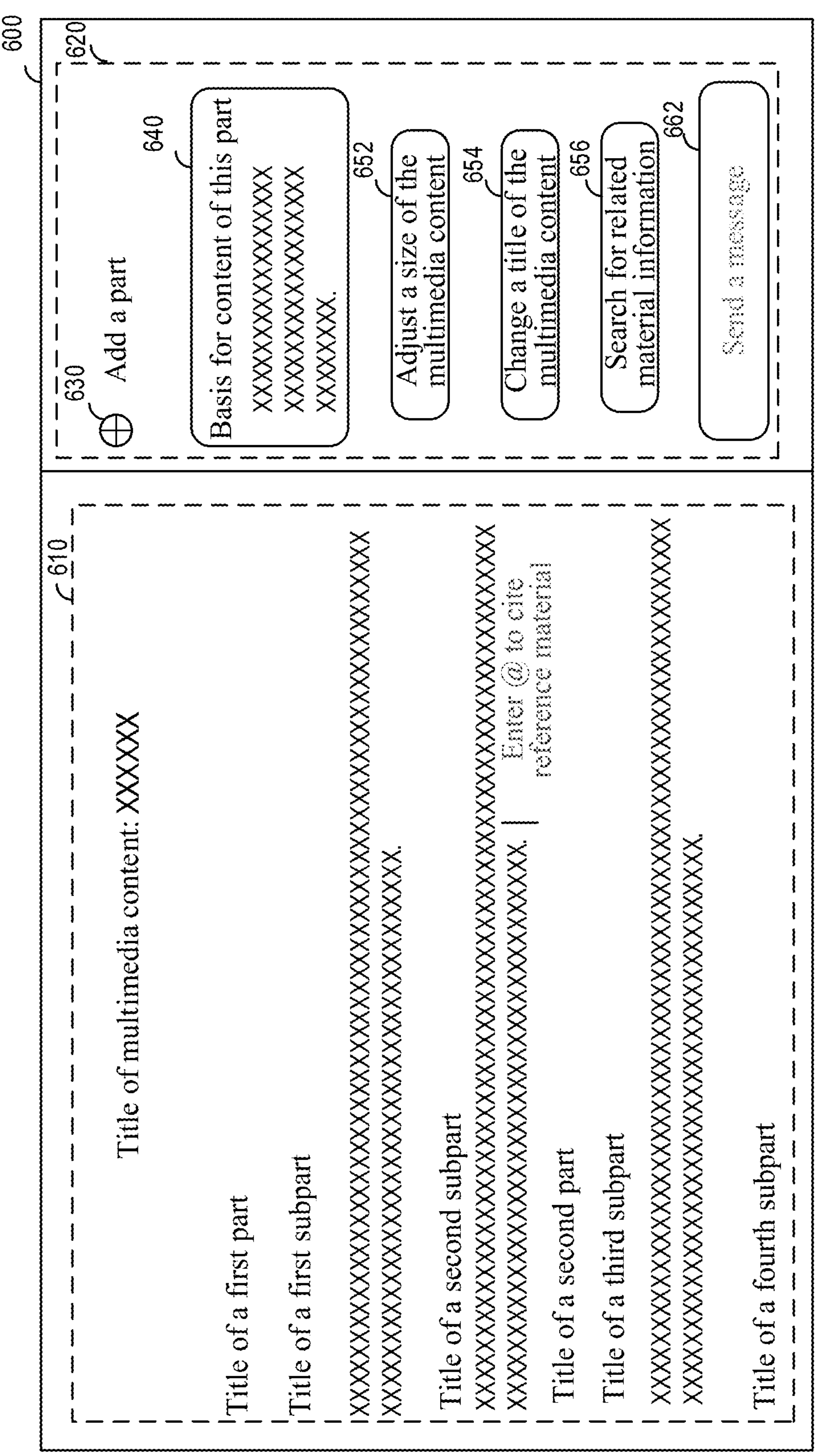
FIG. 6A to FIG. 6E are schematic diagrams of example processes of displaying a part to be associated in multimedia content and material information in association according to an embodiment of the present disclosure.

In FIG. 6A, the computing device 120 may determine the part to be associated in the multimedia content based on the first selection operation (for example, a time in which an identification such as a cursor is located at a location in the multimedia content exceeds a predetermined time threshold) of the user. As shown in FIG. 6A, based on an indication of the cursor, a paragraph below the title of the second subpart is the part to be associated.

In some embodiments, in response to determining the part to be associated, the computing device 120 may further display reference information such as a basis of the part to be associated in a control area 620 by using an information box 640.

Figure 6B:
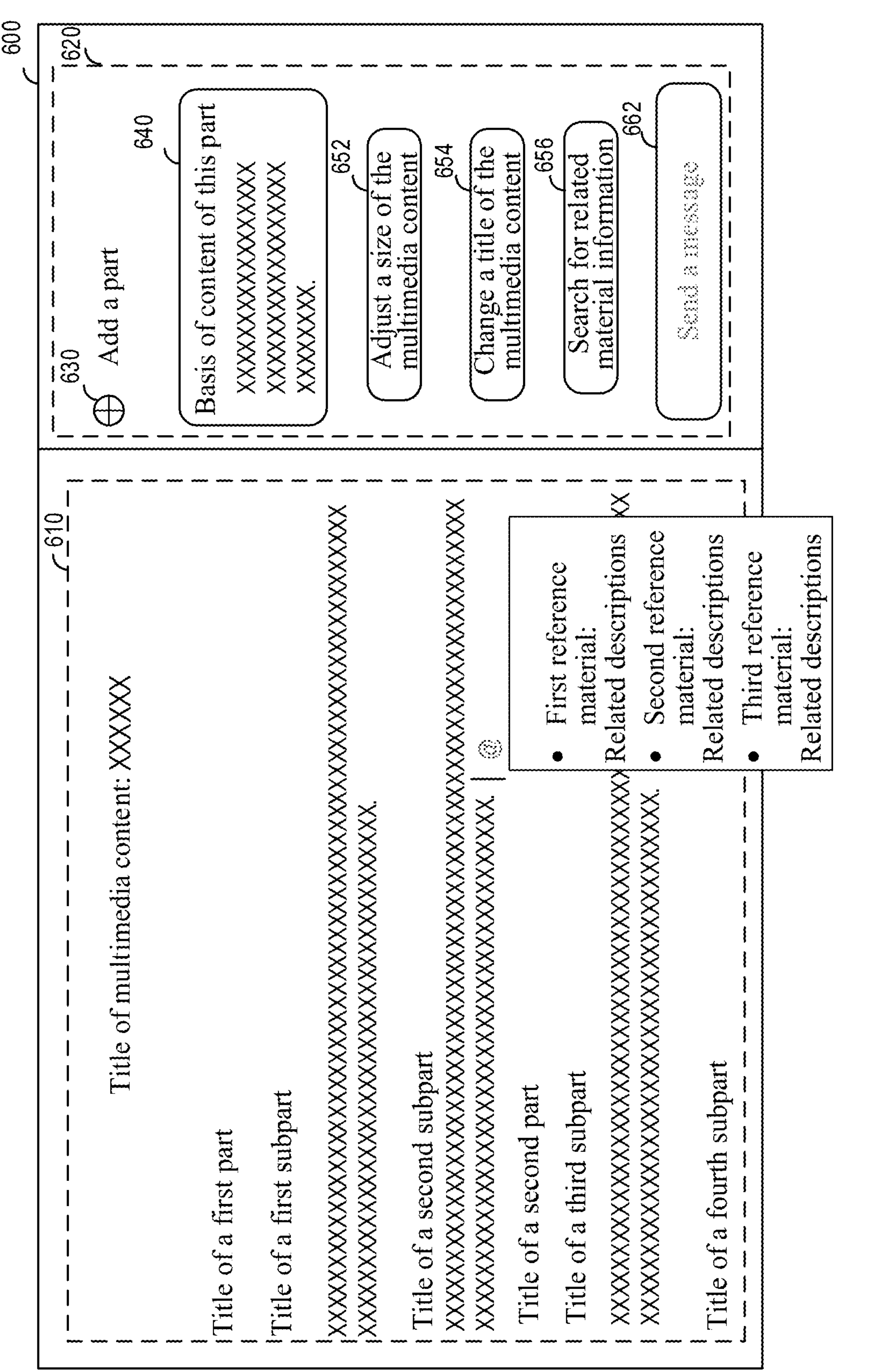

The computing device 120 may further prompt the user to enter a specific identifier around the part to be associated by using prompt information, to browse the reference material information related to the part to be associated. The computing device 120 may display the candidate material information associated with the part to be associated in response to the received trigger identification, as shown in FIG. 6B. FIG. 6B shows the reference material information related to the part to be associated and related descriptions thereof.

Figure 6C:
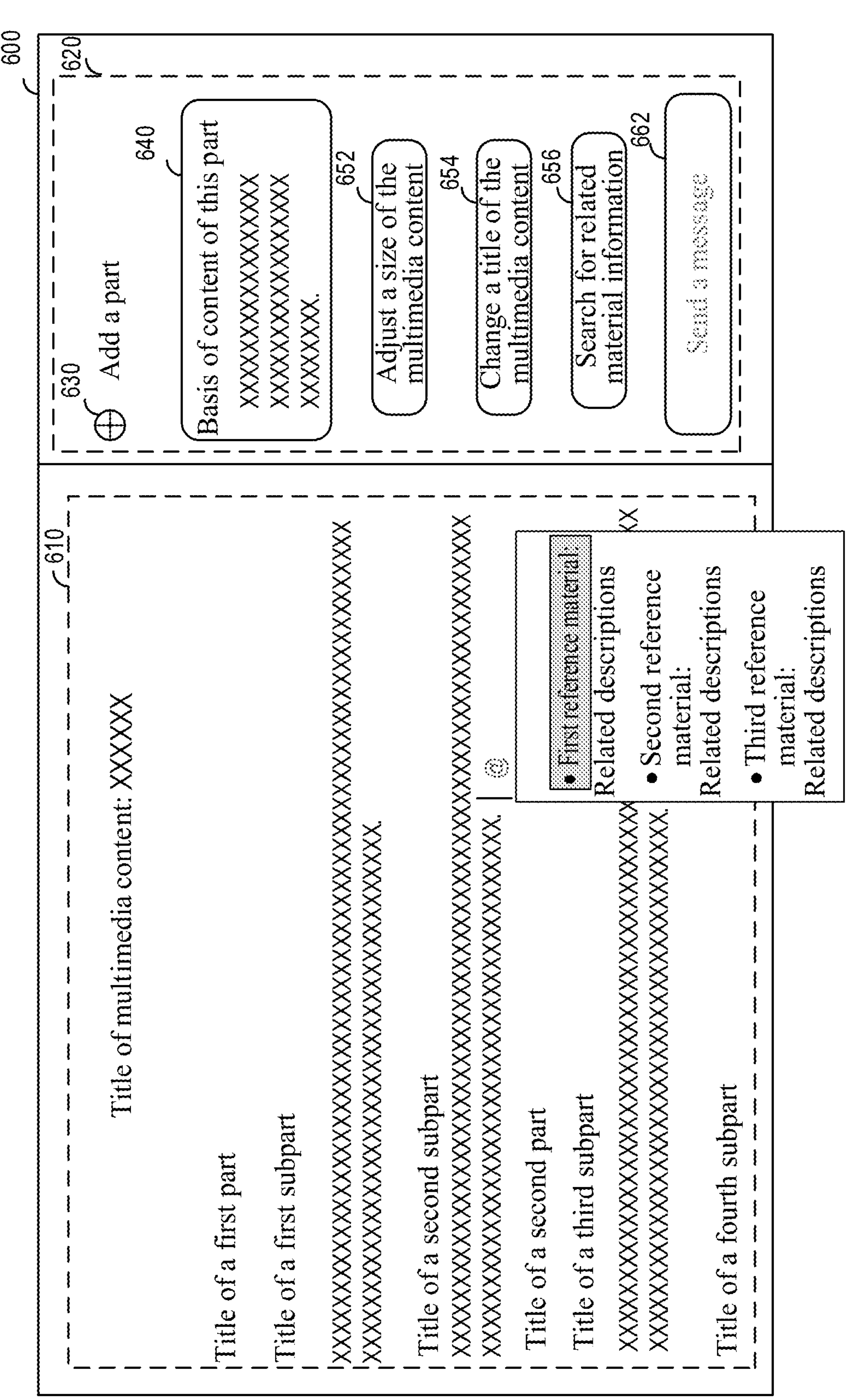

In some embodiments, the computing device 120 may determine reference material information to be displayed in association with the part to be associated in the candidate material information, in response to a second selection operation of the user for the candidate material information. For example, as shown in FIG. 6C, the user selects first reference material by performing a box selection operation. Therefore, the computing device 120 may determine that the user wants to associate the first reference material with the part to be associated and display the first reference material.

Figure 6D:
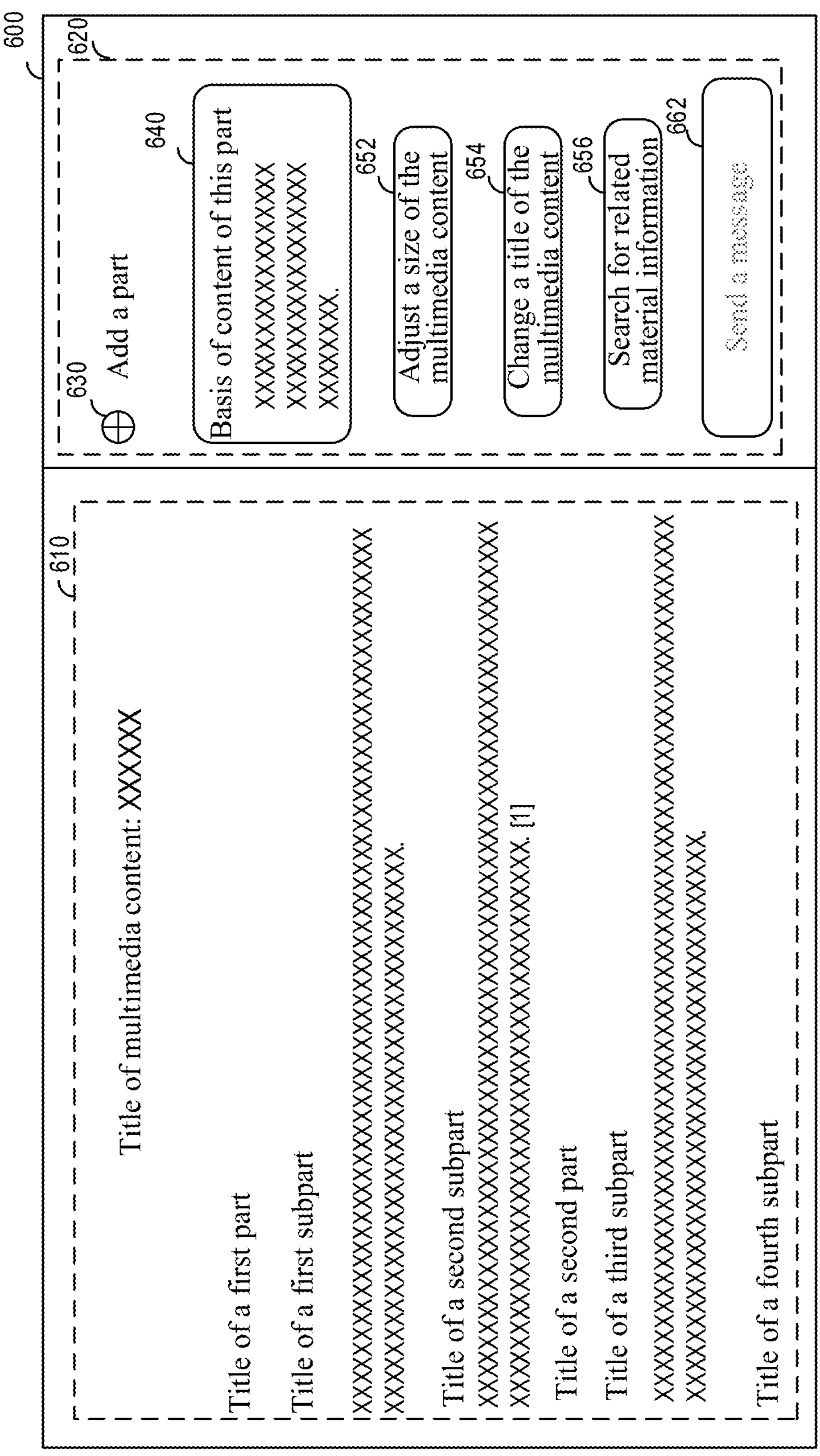
Figure 6E:
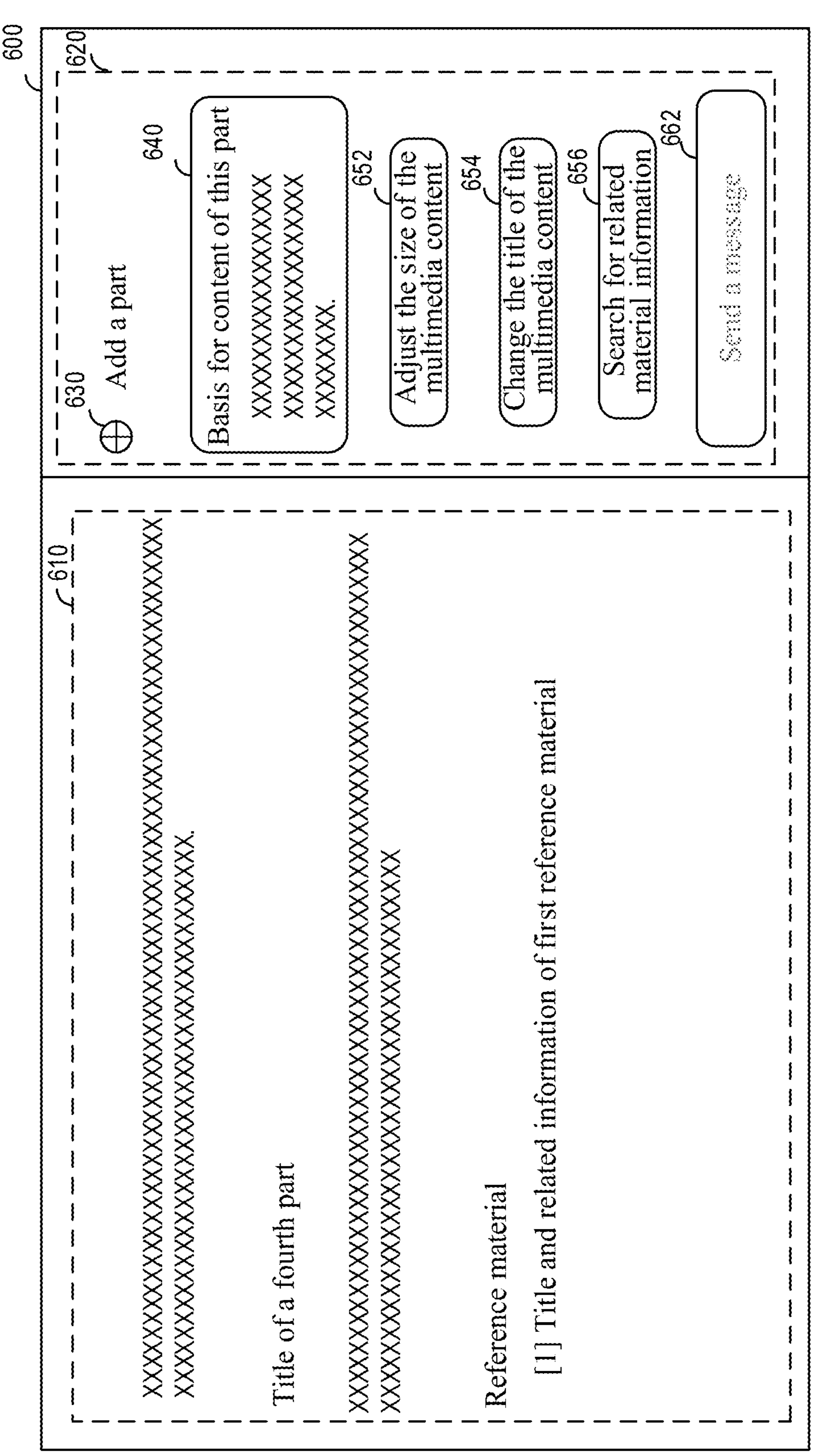

The computing device 120 may display title information of the reference material information in a reference material display area of the multimedia content editing interface 610. In some embodiments, an index of the title information of the reference material information in the reference material display area is the same as an index of the part to be associated. As shown in FIG. 6D, the part to be associated has an index "[1]". Information about the first reference material displayed in association with the part to be associated is displayed in the reference material display area in the multimedia content editing area 610 in FIG. 6E. For example, the first reference material information may be displayed by using a title and other related information associated with the material information, and the index of the first reference material information in the reference material display area is "[1]" and is the same as the index of the part to be associated.

Information association and display of the text content are described above with reference to FIG. 6A to FIG. 6E. It may be understood that for multimedia content such as image or audio, an operation manner of displaying the corresponding part to be associated and the corresponding reference material in association is similar to the process in FIG. 6A to FIG. 6E, and may be understood by a person skilled in the art with reference to the above descriptions. For the sake of brevity, details are not described herein again.

Figure 7:
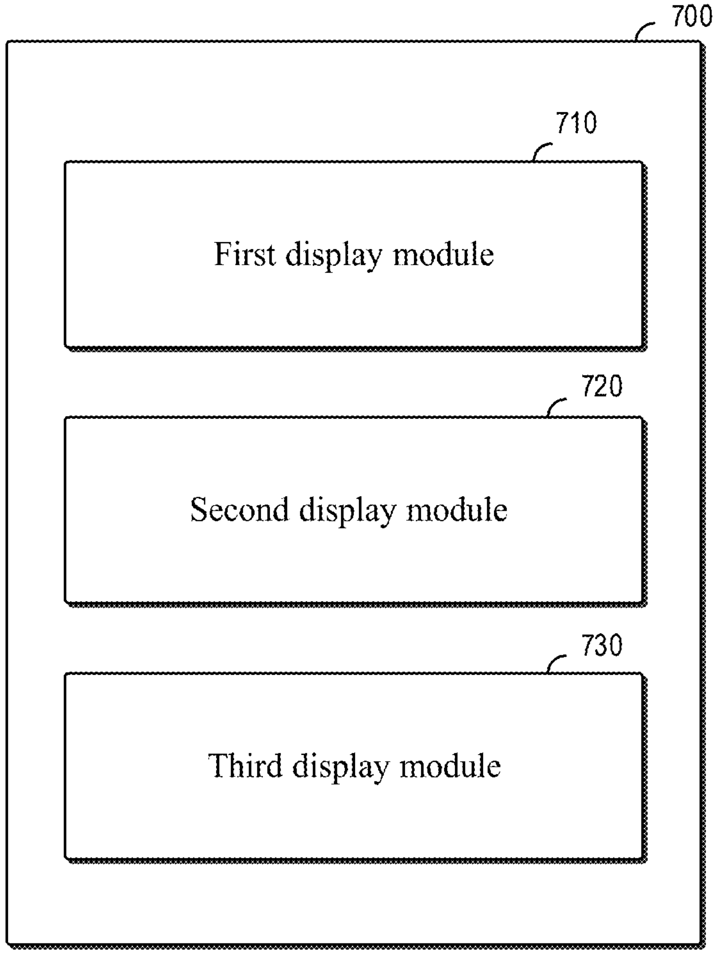
FIG. 7 is a schematic block diagram of an example apparatus according to some embodiments of the present disclosure.

FIG. 7 is a schematic block diagram of an example apparatus 700 according to some embodiments of the present disclosure. The apparatus 700 may be implemented in a form of software, hardware, or a combination of software and hardware. As shown in FIG. 7, the apparatus 700 includes a first display module 710, a second display module 720, and a third display module 730.

In some embodiments, the first display module 710 may display a dialogue interface for generating multimedia content, in response to a trigger operation. The second display module 720 may display, in the dialogue interface, the multimedia content outline associated with the multimedia content to be generated, in response to receiving the request for generating the multimedia content. The third display module 730 may display the generated multimedia content based on a multimedia generation instruction. In some embodiments, the multimedia generation instruction indicates confirmation of the multimedia content outline or confirmation of an edited multimedia content outline in the dialogue interface.

The apparatus 700 in FIG. 7 can be used to implement the process described above with reference to FIG. 1 to FIG. 6E. For brevity, details are not described herein again.

Division into modules or units in the embodiments of the present disclosure is an example and is merely logical function division, and there may be another division manner during actual implementation. In addition, functional units in the embodiments of the present disclosure may be integrated into one unit, each of the units may exist alone physically, or two or more units may be integrated into one unit. The integrated unit may be implemented in the form of hardware, or may be implemented in the form of a software functional unit.

Figure 8:
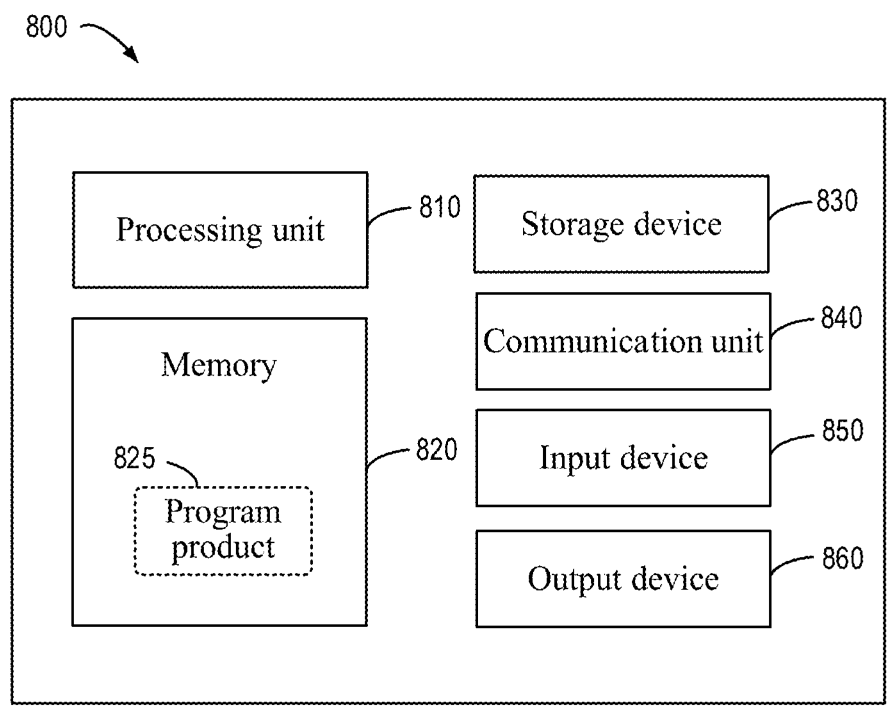
FIG. 8 is a block diagram of an example device that can be used to implement an embodiment of the present disclosure.

FIG. 8 is a block diagram of an example device 800 that may be used to implement an embodiment of the present disclosure. It should be understood that the device 800 shown in FIG. 8 is merely an example, and should not constitute any limitation on the functions and scopes of the implementations described herein. For example, the example device 800 may correspond to the computing device 120 described herein with reference to FIG. 1, and may be used to perform the processes described above in FIG. 1 to FIG. 7.

As shown in FIG. 8, the device 800 is in a form of a general-purpose computing device. Components of the computing device 800 may include but are not limited to one or more processors or processing units 810, a memory 820, a storage device 830, one or more communication units 840, one or more input devices 850, and one or more output devices 860. The processing unit 810 may be a physical or virtual processor, and can perform various processing based on a program stored in the memory 820. In a multi-processor system, a plurality of processing units execute computer-executable instructions in parallel, to improve a parallel processing capability of the computing device 800.

The computing device 800 generally includes a plurality of computer storage media. Such media may be any available media accessible by the computing device 800, including, but not limited to, volatile and non-volatile media and removable and non-removable media. The memory 820 may be a volatile memory (for example, a register, a cache, or a random access memory (RAM)), a non-volatile memory (for example, a read only memory (ROM), an electrically erasable programmable read only memory (EEPROM), or a flash memory), or a certain combination thereof. The storage device 830 may be a removable or non-removable medium, may include a machine-readable medium, for example, a flash drive, a disk, or any other medium, and may be configured to store information and/or data (for example, training data for training) and accessed in the computing device 800.

The computing device 800 may further include other removable/non-removable and volatile/non-volatile storage media. Although not shown in FIG. 8, a disk drive for reading from or writing into removable and non-volatile disks (for example, a "floppy disk") and an optical disc drive for reading from or writing into removable and non-volatile optical discs may be provided. In these cases, each drive may be connected to a bus (not shown) through one or more data medium interfaces. The memory 820 may include a computer program product 825 having one or more program modules that are configured to perform various methods or actions in various implementations of the present disclosure.

The communication unit 840 implements communication with another computing device through a communication medium. In addition, functions of the components of the computing device 800 may be implemented by a single computing cluster or a plurality of computing machines, and these computing machines can communicate through a communication connection. Therefore, the computing device 800 may perform operations in a networked environment through a logical connection to one or more other servers, a network personal computer (PC), or another network node.

The input device 850 may be one or more input devices, such as a mouse, a keyboard, and a trackball. The output device 860 may be one or more output devices, such as a display, a speaker, and a printer. The computing device 800 may further communicate, through the communication unit 840 as required, with one or more external devices (not shown), for example, a storage device and a display device, with one or more devices enabling a user to interact with the computing device 800, or with any device (for example, a network interface card or a modem) enabling the computing device 800 to communicate with one or more other computing devices. Such communication may be performed through an input/output (I/O) interface (not shown).

According to an example implementation of the present disclosure, there is provided a computer-readable storage medium having computer-executable instructions stored thereon. The computer-executable instructions are executed by a processor to implement the method described above. According to an example implementation of the present disclosure, there is further provided a computer program product. The computer program product is tangibly stored on a non-transitory computer-readable medium, and includes computer-executable instructions. The computer-executable instructions are executed by a processor to implement the method described above. According to an example implementation of the present disclosure, there is provided a computer program product having a computer program stored thereon. The program, when executed by a processor, causes the method described above to be implemented.

Various aspects of the present disclosure are described here with reference to the flowcharts and/or the block diagrams of the method, the apparatus, the device, and the computer program product implemented according to the present disclosure. It should be understood that each block of the flowchart and/or the block diagrams and a combination of blocks in the flowchart and/or the block diagrams may be implemented by computer-readable program instructions.

These computer-readable program instructions may be provided to a processing unit of a general-purpose computer, a special-purpose computer, or another programmable data processing apparatus to produce a machine, such that the instructions, when executed by the processing unit of the computer or the another programmable data processing apparatus, create an apparatus for implementing functions/actions specified in one or more blocks in the flowcharts and/or the block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowchart and/or the block diagrams.

The computer-readable program instructions may be loaded onto a computer, another programmable data processing apparatus, or another device, such that a series of operation steps are performed on the computer, the another programmable data processing apparatus, or the another device to produce a computer-implemented process. Therefore, the instructions executed on the computer, the another programmable data processing apparatus, or the another device implement functions/actions specified in one or more blocks in the flowcharts and/or the block diagrams.

The flowcharts and the block diagrams in the accompanying drawings illustrate possible system architectures, functions, and operations of the system, the method, and the computer program product according to a plurality of implementations of the present disclosure. In this regard, each block in the flowcharts or the block diagrams may represent a part of a module, a program segment, or an instruction. The part of the module, the program segment, or the instruction includes one or more executable instructions for implementing a specified logical function. In some alternative implementations, functions marked in the blocks may occur in a sequence different from that marked in the accompanying drawings. For example, two consecutive blocks may actually be executed substantially in parallel, or may sometimes be executed in a reverse order, depending on a function involved. It should also be noted that each block in the block diagrams and/or the flowcharts, and a combination of the blocks in the block diagrams and/or the flowcharts may be implemented by a dedicated hardware-based system that executes specified functions or actions, or may be implemented by a combination of dedicated hardware and computer instructions.

Various implementations of the present disclosure are described above. The above descriptions are examples, not exhaustive, and are not limited to the disclosed implementations. Many modifications and variations are apparent to a person of ordinary skill in the art without departing from the scope and spirit of the described implementations. Selection of terms used in this specification is intended to best explain principles of the implementations, actual application, or improvements to technologies in the market, or to enable another person of ordinary skill in the art to understand the implementations disclosed in this specification.

We claim:

1. An interaction method for multimedia content, comprising:

in response to a trigger operation, displaying a dialogue interface for generating multimedia content;

in response to receiving a request for generating the multimedia content, displaying, in the dialogue interface, a multimedia content outline associated with multimedia content to be generated; and displaying the generated multimedia content based on a multimedia generation instruction, in response to a selection operation for at least part of the multimedia content, determining a part to be edited in the multimedia content; and in response to an edit operation for the part to be edited, displaying the edited multimedia content, wherein the multimedia content outline has a multi-level nested structure and comprises a plurality of levels, each of the plurality of levels comprises at least one part, and each of the at least one part comprises at least one corresponding subpart, and the multimedia generation instruction indicates confirmation of the multimedia content outline or confirmation of an edited multimedia content outline in the dialogue interface; and wherein each part in each level of the generated multimedia content respectively corresponds to each part in each level of the multimedia content outline, and is generated based on corresponding introduction information of each part in each level in the multimedia content outline.

2. The method according to claim 1, further comprising:

in response to an edit operation for the multimedia content outline in the dialogue interface, displaying the edited multimedia content outline.

3. The method according to claim 2, wherein displaying the generated multimedia content based on a multimedia generation instruction comprises:

in response to the received multimedia generation instruction, obtaining, the multimedia content generated based on the edited multimedia content outline; and displaying the multimedia content.

4. The method according to claim 1, wherein the request comprises prompt information associated with the multimedia content to be generated.

5. The method according to claim 1, further comprising:

displaying the edited multimedia content outline based on an edit operation for the multimedia content outline in the dialogue interface, wherein the edit operation comprises at least one of the following:

adjusting at least one part at a corresponding level;

adjusting at least one subpart of a corresponding part;

adjusting an order of a plurality of subparts of a corresponding part;

setting a content size of a corresponding part; or indicating to generate image in a corresponding part, and displaying, in the corresponding part, an attribute of the image to be generated.

6. The method according to claim 1, further comprising:

obtaining material information related to the multimedia content to be generated; and obtaining the multimedia content outline generated based on at least one of the request or the material information.

7. The method according to claim 6, the method further comprises:

displaying title information of the material information in a reference material area of the dialogue interface; and in response to receiving an update operation for the reference material area, updating to display of the reference material area, wherein the update operation comprises either or both of adding the material information or deleting the material information.

8. The method according to claim 1, further comprising:

in response to the received multimedia generation instruction, making a jump from the dialogue interface to a multimedia content editing interface, wherein the generated multimedia content is displayed in the multimedia content editing interface.

9. The method according to claim 8, wherein a type of the multimedia content comprises one or more of the following types: text, image, or audio, and wherein, different types of multimedia content are displayed in multimedia content editing interfaces of corresponding types.

10. The method according to claim 1, wherein the part to be edited comprises a text part, and wherein the edit operation for the part to be edited comprises at least one of the following:

continuing to write the part to be edited;

expanding the part to be edited;

abbreviating the part to be edited;

generating, based on the part to be edited, content extraction corresponding to the part to be edited;

adjusting a tone of the part to be edited;

translating the part to be edited;

correcting syntax of the part to be edited; or generating image based on the part to be edited.

11. The method according to claim 1, wherein the part to be edited comprises an image part, and the edit operation for the part to be edited comprises at least one of the following:

adjusting a filter of the part to be edited;

adjusting an effect of the part to be edited;

adjusting an image feature of the part to be edited;

generating, based on the part to be edited, content extraction corresponding to the part to be edited;

adding corresponding text content or audio content for the part to be edited; or adjusting a style of the part to be edited.

12. The method according to claim 1, further comprising:

in response to the edit operation for the part to be edited, displaying information after the edit operation in a pop-up box; and in response to a trigger operation for a first control in the pop-up box, inserting the information after the edit operation into the multimedia content or replacing the part to be edited in the multimedia content.

13. The method according to claim 12, further comprising:

in response to a trigger operation for a second control in the pop-up box, reperforming the corresponding edit operation on the information; and displaying updated information after the edit operation in the pop-up box.

14. The method according to claim 1, further comprising:

determining a part to be associated in the multimedia content based on a first selection operation of a user; and displaying, based on a received trigger identification, candidate material information associated with the part to be associated.

15. The method according to claim 14, wherein generated multimedia content is displayed in a multimedia content editing interface, and the method further comprises:

in response to a second selection operation of the user for the candidate material information, determining reference material information to be displayed in association with the part to be associated in the candidate material information; and displaying title information of the reference material information in a reference material display area of the multimedia content editing interface, wherein an index of the title information of the reference material information in the reference material display area is the same as an index of the part to be associated.

16. An electronic device, comprising:

at least one processing unit; and at least one memory, wherein the at least one memory is coupled to the at least one processing unit, and stores instructions executable by the at least one processing unit, and the instructions, when executed by the at least one processing unit, cause the electronic device to:

in response to a trigger operation, display a dialogue interface for generating multimedia content;

in response to receiving a request for generating the multimedia content, display, in the dialogue interface, a multimedia content outline associated with multimedia content to be generated; and display the generated multimedia content based on a multimedia generation instruction, in response to a selection operation for at least part of the multimedia content, determining a part to be edited in the multimedia content; and in response to an edit operation for the part to be edited, displaying the edited multimedia content, wherein the multimedia content outline has a multi-level nested structure and comprises a plurality of levels, each of the plurality of levels comprises at least one part, and each of the at least one part comprises at least one corresponding subpart, and the multimedia generation instruction indicates confirmation of the multimedia content outline or confirmation of an edited multimedia content outline in the dialogue interface; and wherein each part in each level of the generated multimedia content respectively corresponds to each part in each level of the multimedia content outline, and is generated based on corresponding introduction information of each part in each level in the multimedia content outline.

17. The electronic device according to claim 16, wherein the instructions further cause the electronic device to:

in response to an edit operation for the multimedia content outline in the dialogue interface, display the edited multimedia content outline.

18. A non-transitory computer-readable storage medium having a computer program stored thereon, the computer program, when executed by a processor, causes the processor to:

in response to a trigger operation, display a dialogue interface for generating multimedia content;

in response to receiving a request for generating the multimedia content, display, in the dialogue interface, a multimedia content outline associated with multimedia content to be generated; and display the generated multimedia content based on a multimedia generation instruction, in response to a selection operation for at least part of the multimedia content, determining a part to be edited in the multimedia content; and in response to an edit operation for the part to be edited, displaying the edited multimedia content, wherein the multimedia content outline has a multi-level nested structure and comprises a plurality of levels, each of the plurality of levels comprises at least one part, and each of the at least one part comprises at least one corresponding subpart, and the multimedia generation instruction indicates confirmation of the multimedia content outline or confirmation of an edited multimedia content outline in the dialogue interface; and wherein each part in each level of the generated multimedia content respectively corresponds to each part in each level of the multimedia content outline, and is generated based on corresponding introduction information of each part in each level in the multimedia content outline.

* * * * *